US012519186B2

United States Patent
Shaffer, II et al.

(10) Patent No.: US 12,519,186 B2
(45) Date of Patent: Jan. 6, 2026

(54) REINFORCED BIPOLAR BATTERY ASSEMBLY

(71) Applicant: ADVANCED BATTERY CONCEPTS, LLC, Clare, MI (US)

(72) Inventors: Edward O. Shaffer, II, Midland, MI (US); Donald Hobday, Kent (GB); Brian R. Sturdavant, Clare, MI (US); Jeffrey L. Adkins, Clare, MI (US); Adam V. Cadena, Auburn, MI (US)

(73) Assignee: ADVANCED BATTERY CONCEPTS, LLC, Clare, MI (US)

( * ) Notice: Subject to any disclaimer, the term of this patent is extended or adjusted under 35 U.S.C. 154(b) by 692 days.

(21) Appl. No.: 16/625,496

(22) PCT Filed: Jun. 25, 2018

(86) PCT No.: PCT/US2018/039279
§ 371 (c)(1),
(2) Date: Dec. 20, 2019

(87) PCT Pub. No.: WO2018/237381
PCT Pub. Date: Dec. 27, 2018

(65) Prior Publication Data
US 2021/0143514 A1 May 13, 2021

Related U.S. Application Data

(60) Provisional application No. 62/524,205, filed on Jun. 23, 2017.

(51) Int. Cl.
*H01M 50/552* (2021.01)
*H01M 50/15* (2021.01)
(Continued)

(52) U.S. Cl.
CPC ....... *H01M 50/552* (2021.01); *H01M 50/507* (2021.01); *H01M 50/54* (2021.01); *H01M 50/15* (2021.01)

(58) Field of Classification Search
CPC ............. H01M 50/502; H01M 50/507; H01M 50/531–56
See application file for complete search history.

(56) References Cited

U.S. PATENT DOCUMENTS

| 414,953 A | 11/1889 | Roberts |
| 1,712,897 A | 5/1929 | Morrison |

(Continued)

FOREIGN PATENT DOCUMENTS

| DE | 3822462 C1 | 11/1989 |
| EP | 0402265 B1 | 3/1995 |

(Continued)

OTHER PUBLICATIONS

International Search Report for Application No. PCT/US2018/039279 dated Jan. 21, 2019.

(Continued)

*Primary Examiner* — Haroon S. Sheikh
(74) *Attorney, Agent, or Firm* — The Dobrusin Law Firm, P.C.; Daniela M. Thompson-Walters

(57) ABSTRACT

A battery assembly including: a) one or more stacks of a plurality of electrode plates comprising one or more bipolar plates having a substrate with an anode on one surface and a cathode on an opposing surface; b) a separator and an electrolyte located between adjacent pairs of the electrode plates of the one or more stacks; c) one or more terminal covers located adjacent to the plurality of electrode plates; and d) one or more terminals which are in contact with one or more current conductors, current collectors, or both and the one or more terminals are configured to transmit elec- (Continued)

trical current from the battery assembly to an exterior load; and wherein the one or more terminals pass through the one or more terminal covers such that the one or more terminals are exposed outside of the battery assembly.

20 Claims, 9 Drawing Sheets

(51) Int. Cl.
*H01M 50/507* (2021.01)
*H01M 50/54* (2021.01)

(56) References Cited

U.S. PATENT DOCUMENTS

| | | | |
|---|---|---|---|
| 4,539,268 A | | 9/1985 | Rowlette |
| 4,861,686 A | | 8/1989 | Snyder |
| 5,002,841 A | | 3/1991 | Belongia |
| 5,114,807 A | | 5/1992 | Rowlette |
| 5,326,656 A | | 7/1994 | Meadows |
| 5,470,679 A | | 11/1995 | Lund |
| 5,682,671 A | | 11/1997 | Lund |
| 6,159,633 A | * | 12/2000 | Yang ................. H01M 10/6553 429/211 |
| 9,263,721 B1 | | 2/2016 | Dhar et al. |
| 2003/0054240 A1 | * | 3/2003 | Aronsson .............. H01M 50/70 429/81 |
| 2007/0148542 A1 | * | 6/2007 | Szymborski ........ H01M 50/534 429/161 |
| 2007/0154786 A1 | * | 7/2007 | Haraldsen ........... H01M 50/562 429/66 |
| 2009/0042099 A1 | | 2/2009 | Tatematsu |
| 2010/0183920 A1 | | 7/2010 | Brecht |
| 2014/0087237 A1 | | 3/2014 | Dhar |
| 2014/0349147 A1 | | 11/2014 | Shaffer, II |
| 2015/0140376 A1 | * | 5/2015 | Shaffer .................... H01M 6/48 429/72 |
| 2016/0197373 A1 | | 7/2016 | Shaffer, II |
| 2017/0077545 A1 | | 3/2017 | Shaffer, II |
| 2017/0179536 A1 | * | 6/2017 | Fairchild .............. H01M 10/14 |

FOREIGN PATENT DOCUMENTS

| | | | |
|---|---|---|---|
| EP | 1419549 A1 | 5/2004 |
| FR | 55043 E | 6/1951 |
| JP | S60189867 A | 9/1985 |
| RU | 2030034 C1 | 2/1995 |
| WO | 94/007272 A1 | 3/1994 |
| WO | 99/63611 A1 | 12/1999 |
| WO | 2003/007415 A1 | 1/2003 |

OTHER PUBLICATIONS

Indian Examination Report dated Jul. 8, 2020, Application No. 201917053277.

German Examination Notice dated Feb. 3, 2025, Application No. 11 2018 002 624.8.

* cited by examiner

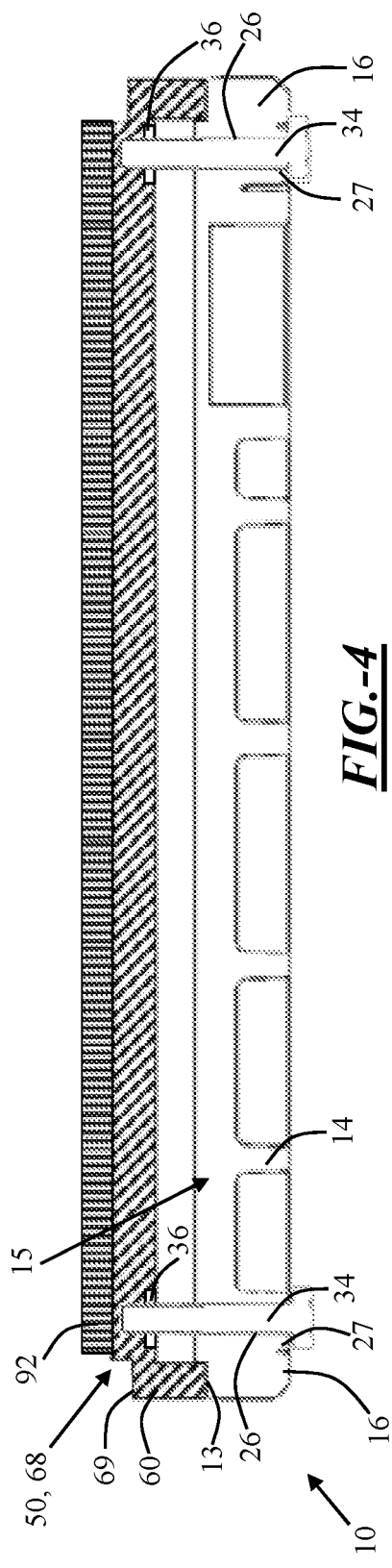
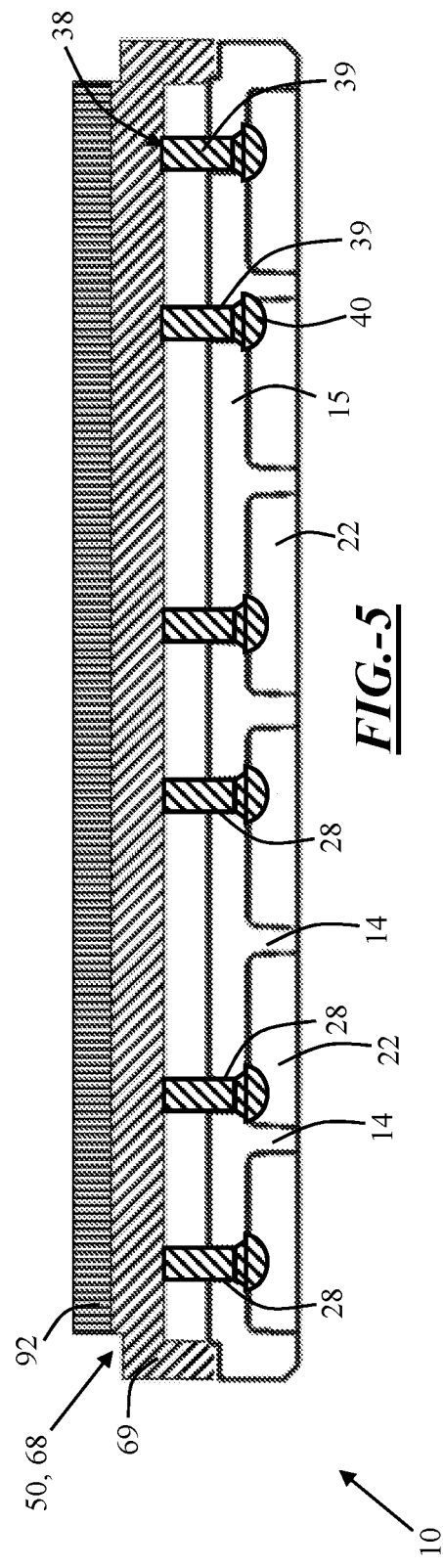

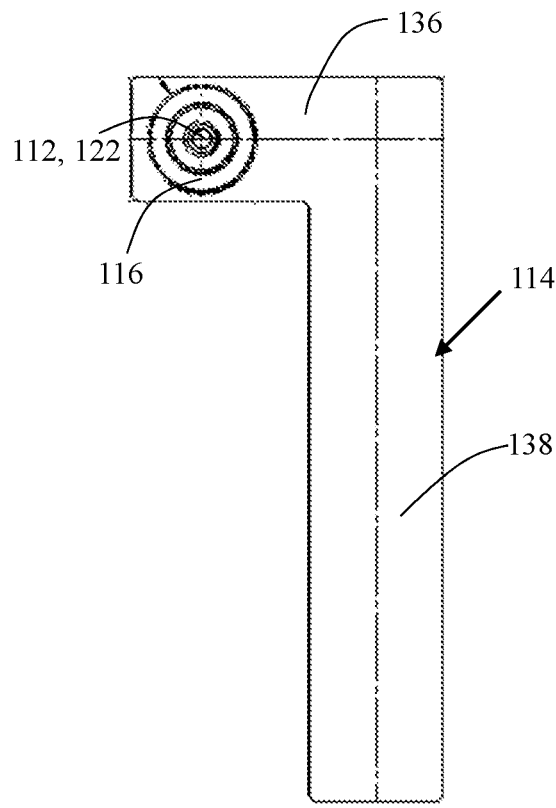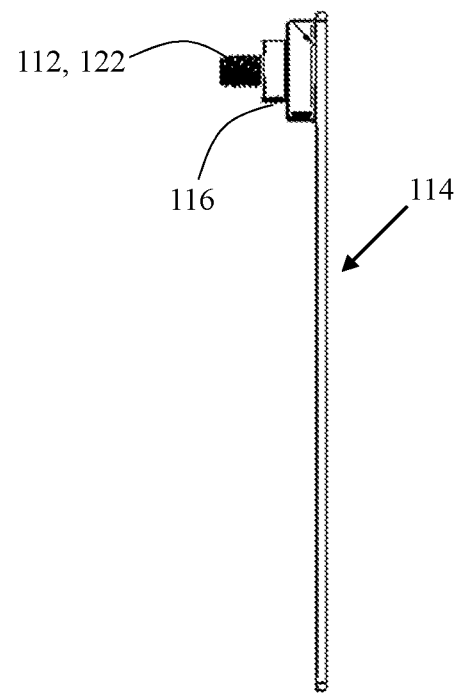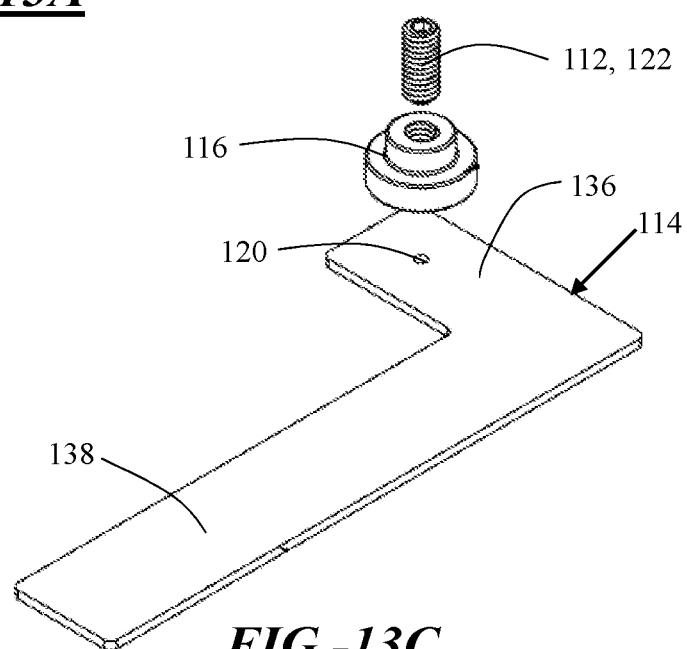
FIG.-13A
FIG.-13B
FIG.-13C

REINFORCED BIPOLAR BATTERY ASSEMBLY

FIELD

The present disclosure relates generally to a bipolar battery assembly and specifically to a reinforced bipolar battery assembly. The present disclosure may find particular use in reinforcing a bipolar battery assembly during vacuum filling and operation of the assembly. The present disclosure may also find particular use in reinforcing a bipolar battery assembly to resist external vibrations, impacts, and pulling.

BACKGROUND

Traditionally, bipolar battery assemblies, such as that taught in US Publication No. US 2009/0042099, incorporated herein by reference, include an electrolyte within a stack of electrode plates, located between the separators and electrode plates. The electrolyte allows electrons and ions to flow between the cathode and anode material of the electrode plates. To provide an electrode which does not leak from the electrode stack or into channels of the stack, a solid electrolyte can be used to reduce the need for separate sealing members within the battery assembly.

Although the use of solid electrolyte may be useful in preventing leakage of the electrolyte, it can be advantageous to fill a battery assembly with a liquid electrolyte under a vacuum. Pairs of electrode plates of the battery assembly may form electrochemical cells. By sealing off the battery assembly and filling under a vacuum, an electrolyte may be able to be drawn into the individual electrochemical cells. Under a vacuum, the electrolyte fill rates may be expedited to allow for commercially acceptable fill rates; air pockets or bubbles may be prevented from forming between layers of the battery assembly; and electrochemical cells may be uniformly filled with electrolyte. U.S. Pat. Nos. 4,861,686; 5,470,679; 5,682,671; EP U.S. Pat. No. 402,265; and PCT Publication No. WO 1994/007272, incorporated herein by reference in their entirety for all purposes, discuss the advantages of filling battery assemblies under a vacuum. US Publication No. 2014/0349147, incorporated by reference in its entirety for all purposes, teaches an elegant solution for filling a battery assembly with a liquid electrolyte while using interlocking components to create a leak proof seal to prevent leaking of the liquid electrolyte. Notwithstanding the above, there is still a need to incorporate a liquid electrolyte into a battery assembly while eliminating the need for complex sealing configurations to prevent the electrolyte from leaking from or within the battery assembly.

To draw a vacuum from a battery assembly, the battery assembly may be placed within a vacuum chamber to activate drawing of an electrolyte into the cells of the battery. Alternatively, or in conjunction with a vacuum chamber, separate openings in the battery assembly may be used for drawing the vacuum and filling the assembly with an electrolyte. The drawbacks associated with having separate ports for drawing a vacuum and filling a battery assembly include additional component and manufacturing costs for separate ports and increased time and difficulty to connect and seal multiple ports during assembly in mass production environments. US Publication No. 2014/0349147 teaches how to overcome the need for a separate vacuum chamber and use a single port as a vacuum purge port and an electrolyte fill port. Notwithstanding the above, there is still an ongoing need to quickly fill a battery assembly with electrolyte while ensuring adequate and uniform filling of each electrochemical cell.

Generally, battery assemblies include end plates designed to resist outward bulging during operation of a bipolar battery assembly to properly maintain a seal about and within the battery assembly. The outward bulging is a result of a positive pressure differential between the higher pressures experienced inside of the battery assembly during operation compared to the external pressure (i.e., atmospheric pressure). As taught in US Publication No. 2014/0349147, the use of heavy end plates can be avoided by using an internal structure within the battery assembly which creates an external seal and prevents any liquid or gas from escaping the battery assembly. It may be advantageous to avoid bulky or heavy end plates to provide for a lighter weight battery assembly so that the battery assembly may be integrated into a number of systems which take overall system weight into account. A problem encountered when a single port is used for both creating an internal vacuum within the battery assembly and filling the battery assembly, is internal forces are created when the interior of the battery assembly during creation of the vacuum.

When a single port is used both for creating an internal vacuum within the battery assembly and filling the battery assembly, internal forces are created within the interior of the battery assembly. These internal forces are a result of the negative pressure differential between the extremely low pressure within the interior of the battery assembly due to the vacuum. While a stack of electrode plates having a pair of end plates and/or interlocked electrode plates are sufficiently rigid to withstand outward deformation from positive pressure differentials during operation of a battery assembly, typical electrode plates and end plates may not be able to resist inward deformation from an internal vacuum. Inward deformation may be defined as an inward bending or collapsing of an electrode plate. Generally, as an end plate is attached only about at least a portion of periphery to an adjacent electrode plate, the end plate does not prevent inward deformation of adjacent electrode plate. This inward deformation of the electrode plate may result in reduced interior volume of the battery assembly prior to filling with electrolyte, causing non-uniform and inadequate filling of the electrolyte into the cell. Additionally, as disclosed in US 2014/0349147, stacks of electrode plates may be sealed about their edges and/or along the length of channels formed through the stack through an interference fit. The inward deformation of the electrode plates may result in breaking of the interference fit, thus breaking the seal and causing electrolyte to leak outside of the battery assembly and/or into one or more channels, and the deformed electrode plate may become cracked or otherwise permanently deformed.

External forces from the environment may damage a bipolar battery assembly. Battery assemblies may have poor vibration resistance, resulting in damage to portions of, some, or all of the individual electrochemical cells of a bipolar battery assembly. Some battery assemblies when subjected to vibrational forces may experience movement of one or more of the components within the battery assembly, thus resulting in internal damage to the cells. An impact to the battery assembly, either indirectly or directly, may have a tendency to not only damage the interior of the assembly but also the exterior. This damage is a result of the impact energy transferring from an exterior of the battery assembly to the interior.

Some battery assemblies include current conductors located within the one or more cells and which transfer an electrical current from an interior of the battery to an exterior of the battery. These current conductors may be subject to damage. Some current conductors are may be configured as tabs which project from one or more of the electrochemical cells. These tabs may be susceptible to being pulled out during handling of the battery assembly, thus resulting in damage to the cell and the current conductor. Additionally, during vibrations or impacts to the battery assembly during operation, the continuous exposure to vibration may cause the current conductor to be pulled out or dislocated relative to the electrochemical cell.

What is needed is a battery assembly able to incorporate a liquid electrolyte into a battery assembly under an internal vacuum which maintains a seal about the liquid electrolyte. What is needed is a battery assembly having a single port for both pulling a vacuum inside of the battery assembly and uniformly filling the battery assembly with a liquid electrolyte. What is needed is a lighter weight battery assembly able to resist outward deformation of electrode plates resulting from temperatures and pressures generated during operation and inward deformation of the electrode plates resulting from the creation of an internal vacuum. What is needed is a low weight external support structure. What is needed is a reinforcement structure able to resist vibration, impact, and pulling to thus provide a battery assembly which has increased stability to external mechanical forces. What is needed is a reinforcement structure which is able to absorb or deflect an impact force. Further, what is needed is a current conductor which can resist dislocation from an electrochemical cell.

SUMMARY

The present disclosure relates to a battery assembly comprising: a) one or more stacks of a plurality of electrode plates comprising one or more bipolar plates having a substrate with an anode on one surface and a cathode on an opposing surface; b) a separator and an electrolyte located between adjacent pairs of the electrode plates of the one or more stacks; c) one or more terminal covers located generally perpendicular and adjacent to the plurality of electrode plates; and d) one or more terminals which are in contact with one or more current conductors, current collectors, or both and the one or more terminals are configured to transmit electrical current from the battery assembly to an exterior load; and wherein the one or more terminals pass through the one or more terminal covers such that the one or more terminals are exposed outside of the battery assembly.

The battery assembly may include one or more of the following features in any combination: the terminal cover may include one or more openings; one or more terminals may pass from an interior of the battery assembly to an outside of the battery assembly through the one or more openings; one or more openings of the terminal cover may be reinforced by one or more reinforcement structures; one or more reinforcement structures include one or more ribs, strakes, gussets, backing plates, fiber fillers, or any combination thereof; one or more reinforcement structures may include a plurality of gussets and/or ribs encircling about the one or more openings of the terminal cover; one or more openings may include one or more raised surfaces, bosses, inserts, or any combination thereof which may at least partially surround the one or more opening and project outwardly from an outwardly facing surface of the one or more terminal covers; one or more reinforcement structures may be located about and provide reinforcement to the one or more raised surfaces, bosses, inserts, or any combination thereof; one or more reinforcement structures may be connected to both the outwardly facing surface and the one or more raised surfaces, bosses, inserts, or any combination thereof; one or more terminal covers may be attached to one or more peripheral edges of one or more electrode plates, a membrane, one or more end plates, an exterior case, or any combination thereof of the battery assembly; the terminal cover may be attached with one or more adhesive materials, welding, tapes, heat stakes, mechanical fasteners, a friction fit about at least a periphery of a stack of the electrode plates, or any combination thereof; one or more openings may include a plurality of fastener openings; a plurality of fasteners may pass through the fastener openings to secure the one or more terminal covers to the battery assembly, stack of electrode plates, separators, one or more membranes, an exterior cover, or any combination thereof; one or more terminal covers may include one or more seals located about an interior perimeter of each of the one or more terminals covers, located within one or more openings of the internal cover, or both; one or more terminals may include one or more mechanical fasteners, posts, recesses, or a combination thereof; one or more terminals may be comprised of one or more conductive materials; one or more posts include one or more SAE Posts, JIS posts, L terminals, or a combination thereof; one or more terminals may pass through or are in contact with one or more buss bars which are comprised of cone or more conductive materials; one or more buss bars may be located between the one or more terminals covers and the one or more stacks of the plurality of electrode plates, the separators, a membrane, an exterior case, or any combination thereof; one or more buss bars may be affixed to the one or more terminal covers, the membrane, the exterior case, the one or more stacks of the plurality of electrode plates, the separators, or any combination thereof; one or more buss bars may be molded into the one or more terminal covers; one or more buss bars may be in contact with, electrical communication with, affixed to, or any combination thereof of one or more of the anodes, cathodes, current conductors, current collectors, connections pads, or any combination thereof; one or more electrode plates may include one or more current conductors which may be configured to transfer an electrical current from an interior of the one or more stacks of the electrode plates to an exterior of the one or more stacks of the electrode plates; one or more current conductors may be affixed to, extend into, and protrude from one or more end plates, monopolar plates, or both of the battery assembly; one or more current conductors are in electrical communication with the one or more terminals; one or more end plates have one or more connection pads, current collectors, or both located on a surface facing toward the one or more stacks of the electrode plates and in electrical communication with the one or more current conductors; one or more end plates may be the first monopolar plate, the second monopolar plate, an end plate adjacent to the first monopolar plate, an end plate adjacent to the second monopolar plate, or any combination thereof; one or more connection pads, current collectors, or both may be located on a surface of the end plate opposite a reinforcement structure and facing toward the plurality of electrode plates; one or more connection pads may include a single or a plurality of connection pads; one or more connection pads may form a straight line, a J-shape, an L-shape, a T-shape, or a combination thereof on a surface of the one or more monopolar plates, end plates, or both; the battery assembly may include a first end plate with an internal reinforcement structure and attached at an end of the one or more stacks; the battery assembly may include a second end plate having an internal reinforcement structure and attached at an opposing end of the one or more stacks as the first end plate; the first end plate may be affixed to or may be a first monopolar plate; the second end plate may be affixed to or may be a second monopolar plate; a first monopolar plate may have a cathode deposited on a surface which faces toward the one or more bipolar plates; a second monopolar plate may have an anode deposited on a surface which faces toward the one or more bipolar plates; one or more internal reinforcement structures may reinforce the plurality of the electrode plates during an evacuation of about 5 psi to about 30 psi prior to filling with the electrolyte; one or more internal reinforcement structure may comprise a plurality of rib structures which may be molded into an outwardly facing surface of the first end plate and the second plate; a first end plate and a second end plate may be attached about a periphery, an inner surface, or both to an adjacent monopolar plate, bipolar plate, or both; one or more stacks of the plurality of electrode plates may be assembled into electrochemical cells; one or more openings may be located in each of the one or more bipolar plates, the end plates, monopolar plates, the separator, or any combination thereof such that the openings align with one another in a transverse direction to form one or more channels which are integrated into the battery assembly; one or more openings may include one or more inserts molded therein which interlock to seal the one or more channels; the electrolyte may be a liquid electrolyte; the terminal cover may be part of or separate from a membrane, casing, end plate, or any combination thereof of the battery assembly; the terminal cover may include one or more openings having one or more seals therein between a surface of the one or more openings and the one or more terminals; the one or more buss bars may have one or more terminal retainers which may extend away from a surface of the buss bar and include one or more terminals located therein; and wherein the one or more terminal retainers may include a seal located about at least a portion of a periphery of the terminal retainer, within at least a portion of an interior of the terminal retainer, or both.

The battery assembly of the disclosure may be able to have an internal vacuum drawn to uniformly distribute a liquid electrolyte while maintaining a seal about the liquid electrolyte. The battery assembly of the disclosure may be able to use a single port for both drawing an internal vacuum and filling of a liquid electrolyte. The battery assembly of the disclosure may include at least two end plates on opposing ends of an electrode stack which may provide a low-weight solution to resist both outward deformation of the electrode plates during operation and inward deformation of the electrode plates from negative pressure generated during the creation of an internal vacuum. The end plates may resist inward deformation of an electrode plate by being attached about a periphery and/or an interior and having an internal reinforcement structure able to distribute the internal load resulting from the negative pressures of an internal vacuum. The end plates may be able to resist deformation of the electrode plates when drawing an internal vacuum of the battery assembly of about 5 psi (about 34.5 kPa) to about 30 psi (about 207 kPa). One or more terminal covers may provide protection to one or more current conductors while allowing for electrical connection to one or more terminals. One or more terminal covers may cooperate with one or more reinforcement structures of one or more end plates to resist vibration and impacts to the battery assembly and thus have increased stability to external mechanical forces. One or more terminal covers may allow for more efficient collection of current within a battery assembly and transferring to one or more current conductors and then to one or more terminals. One or more terminal covers may offer protection to one or more peripheral edges of one or more electrode plates, separators, or both of a battery assembly.

BRIEF DESCRIPTION OF DRAWINGS

FIG. 4 is a cross-section view along section A-A as shown in FIG. 1.

FIG. 5 is a cross-section view along section B-B as shown in FIG. 1.

FIG. 13A is a plan view of a buss bar and terminal assembly.

FIG. 13B is a side elevation view of a buss bar and terminal assembly.

FIG. 13C is an exploded view of a buss bar and terminal assembly.

DETAILED DESCRIPTION

Figure 1:
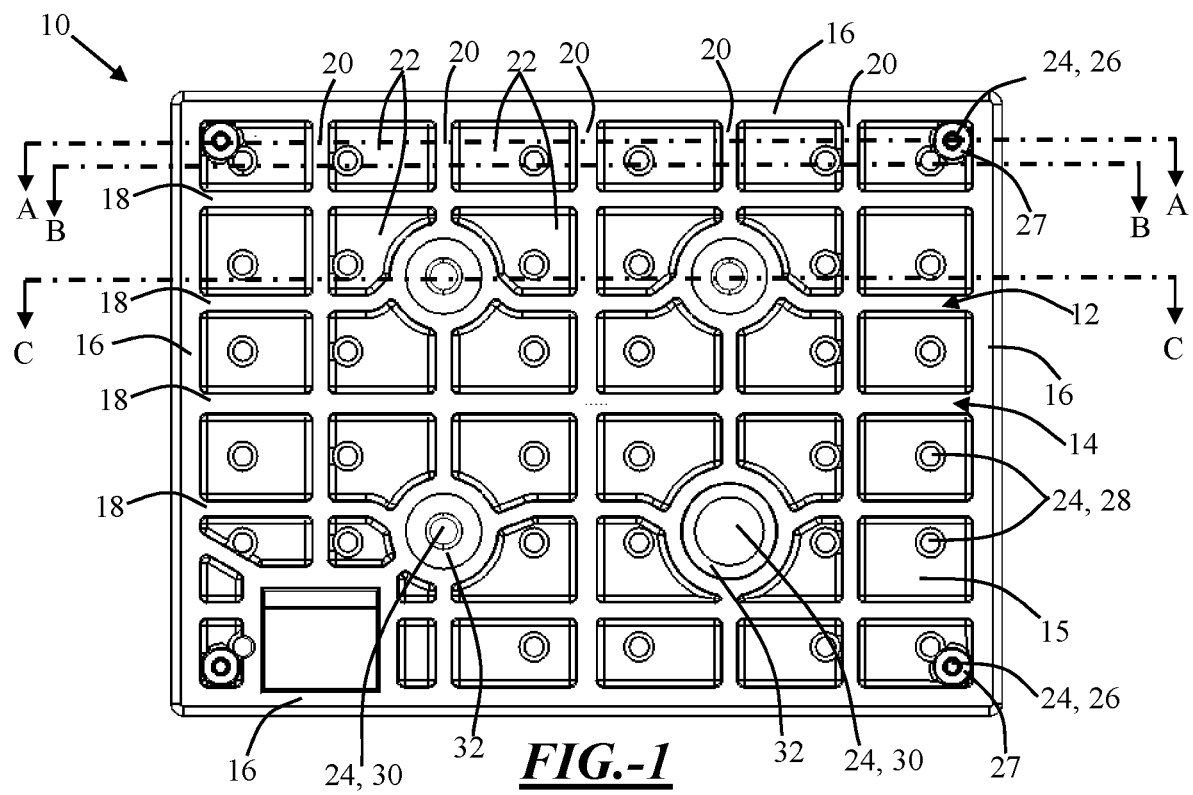
FIG. 1 is a front view of an end plate having an internal reinforcement structure.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The battery assembly of the disclosure generally relates to a battery assembly and may find particular use as a bipolar battery assembly. The battery assembly includes one or more stacks of a plurality of electrode plates. The plurality of electrode plates includes one or more bipolar plates. The one or more bipolar plates include a substrate having an anode one surface and a cathode on an opposing surface. The plurality of electrode plates may include one or more monopolar plates which may be located at opposing ends of the one or more stacks. A monopolar plate may include either an anode or a cathode deposited on a surface. The stack includes a separator and an electrolyte located between each adjacent pair of the electrode plates. The battery assembly may include one or more end plates, such as a first end plate and a second plate. The one or more end plates are attached at one or more ends of the stack. The one or more end plates may be the one or more monopolar plates or separate from the monopolar plates. For example, a first end plate may be attached at an opposing end of the stack as a second end plate. The one or more end plates may be particularly useful for reinforcing one or more electrode plates during drawing of a vacuum within the battery assembly, filling of the battery assembly, during operation in a charge and/or discharge cycle of the battery assembly, or any combination thereof. The battery assembly also includes one or more terminal covers. Each terminal cover is generally perpendicular and adjacent to the plurality of electrode plates, end plates, or both. One or more terminals may pass through the one or more terminals covers such that the one or more terminals are exposed outside the battery assembly. The one or more terminal covers may be advantageous in reinforcing the battery assembly against external forces, such as impact. The one or more terminal covers may protect one or more current conductors such that they may remain intact within the battery assembly and in electrical communication with one or more terminals.

The disclosure relates to electrode plates useful in use as bipolar plates, monopolar plates, dual polar plates, the like or any combination thereof. An electrode plate may function as one or more electrodes, include one or more electroactive materials, be part of an electrochemical cell, form part of one or more sealing structures, or any combination thereof. A plurality of electrode plates may function to conduct an electric current (i.e., flow of ions and electrons) within the battery assembly. A plurality of electrode plates may form one or more electrochemical cells. For example, a pair of electrode plates, which may have a separator and/or electrolyte therebetween, may form an electrochemical cell. The number of electrode plates present can be chosen to provide the desired voltage of the battery. The battery assembly design provides flexibility in the voltage that can be produced. The plurality of electrode plates can have any desired cross-sectional shape and the cross-sectional shape can be designed to fit the packaging space available in the use environment. Cross-sectional shape may refer to the shape of the plates from the perspective of the faces of the sheets. Flexible cross-sectional shapes and sizes allow preparation of the assemblies disclosed to accommodate the voltage and size needs of the system in which the batteries are utilized. Opposing end plates may sandwich a plurality of electrode plates therebetween. The one or more electrode plates may include one or more nonplanar structures such as described in PCT Application No. PCT/US2018/033435, incorporated herein by reference in its entirety.

One or more electrode plates may include one or more bipolar plates. The one or more bipolar plates may include a single or a plurality of bipolar plates. Plurality as used herein means that there are more than one of the plates. A bipolar plate comprises a substrate. The substrate may be in the form of a sheet having two opposing faces. Located on the opposing faces are a cathode and an anode. The cathode and the anode may be in the form of a paste applied onto the substrate. The cathode, the anode, or both may include a transfer sheet. The bipolar plates may be arranged in a battery assembly in one or more stacks so that the cathode of one bipolar plate faces the anode of another bipolar plate or a monopolar plate, and the anode of each bipolar plate faces the cathode of a bipolar or monopolar plate.

One or more electrode plates may be one or more monopolar plates. The one or more monopolar plates may include a single or a plurality of monopolar plates. The one or more monopolar plates may include a monopolar plate located at each opposing end of a plurality of electrode plates. The one or more monopolar plates may include a first monopolar plate and as second monopolar plate. Opposing monopolar plates may include one or more bipolar plates located therebetween. One or more monopolar plates may be located adjacent to, may be part of, or may be, one or more end plates. For example, each of the monopolar plates may be located between an adjacent end plate and an adjacent bipolar plate. One or more monopolar plates may be attached to one or more end plates. One or more monopolar end plates may be affixed to an end plate as taught in any of U.S. Pat. Nos. 8,357,469; 9,553,329; and US Patent Application Publication No. 2017/0077545; incorporated herein by reference in their entirety for all purposes. As another example, the one or more monopolar plates may be one or more end plates located at opposing ends of the battery assembly. One or more monopolar end plates may include one or more reinforcement structures as disclosed in US Patent Application Publication No. 2017/0077545. One or more monopolar plates may be prepared from the same substrates, anodes, cathodes, or a combination thereof used in one or more of the bipolar plates. One monopolar plate of a battery assembly may have a substrate with a cathode disposed thereon. One monopolar plate of a battery assembly may have a substrate with an anode disposed thereon. A surface or side of a monopolar plate opposing the surface with the anode or cathode deposited thereon and/or facing an end plate may be a bare surface of a substrate (e.g., free of conductive material such as an anode or cathode).

One or more electrode plates may include one or more dual polar plates. A dual polar electrode plate may function to facilitate electrically connecting one or more stacks of electrode plates with one or more other stacks of electrode plates, simplify manufacturing and assembly of the two or more stacks, or both. Using dual polar plate stacks to electrically connect two or more stacks of electrode plates may allow the individual stacks of electrode plates to be formed as a standard size (e.g., number of plates and/or electrochemical cells) and then assembled to form the bipolar battery assembly; easily vary the number of individual stacks of electrode plates to increase or decrease the power generated by the bipolar battery assembly; or both. The dual polar plates may include one or more substrates. One or more substrates may include a single substrate or a plurality of substrates. One or more substrates may include one or more conductive substrates, one or more non-conductive substrates, or a combination of both. A plurality of conductive substrates may include a first conductive substrate and a second conductive substrate. For example, a dual polar plate may comprise a first conductive substrate and a second conductive substrate with a nonconductive substrate located therebetween. As another example, the dual polar plate may comprise a nonconductive substrate. As another example, the dual polar plate may comprise a single conductive substrate. The one or more substrates of the dual polar plate include opposing surfaces. The opposing surfaces may have an anode, cathode, current collector, current conductor, current conduit, or any combination thereof deposited and/or in contact with a portion of the surface. A conductive substrate of the dual polar plate may have an anode or cathode deposited on a surface or on both opposing surfaces. Having the same anode or cathode on the opposing surfaces may simplify manufacturing by requiring only one electrical connection (e.g., via a positive or negative current conductor) to another current conductor (e.g., current collector, conductor, conduit, terminal) of the one or more stacks (e.g., a positive or negative current conductor, collector, conduit, or terminal of a monopolar plate). A substrate of the dual polar plate may have a current collector disposed on one or both opposing surfaces. The current collector may be disposed between the cathode or the anode and a surface of the substrate. Exemplary dual polar plates and integration into a battery assembly are disclosed in U.S. Pat. Nos. 9,685,677; 9,825,336; and US Patent Application Publication No.: 2018/0053926; incorporated herein by reference in their entirety for all purposes.

One or more electrode plates may include one or more substrates. One or more substrates may function to provide structural support for the cathode and/or the anode; as a cell partition, so as to prevent the flow of electrolyte between adjacent electrochemical cells; cooperating with other battery components to form an electrolyte-tight seal about the electrode plate edges, which may be on the outside surface of the battery; and, in some embodiments, to transmit electrons from one surface to the other. The substrate can be formed from a variety of materials depending on the function or battery chemistry. The substrate may be formed from materials that are sufficiently structurally robust to provide the backbone of a desired electrode plate, withstanding temperatures that exceed the melting points of any conductive materials used in the battery construction, and having high chemical stability during contact with an electrolyte (e.g., sulfuric acid solution) so that the substrate does not degrade upon contact with an electrolyte. The substrate may be formed from suitable materials and/or is configured in a manner that permits the transmission of electricity from one surface of the substrate to an opposite substrate surface. The substrate may be formed from an electrically conductive material, e.g., a metallic material, or can be formed from an electrically non-conductive material. Exemplary non-conductive material may include polymers, such as thermoset polymers, elastomeric polymers, or thermoplastic polymers, or any combination thereof. The substrate may comprise a generally non-electrically conductive substrate (e.g., a dielectric substrate). The non-conductive substrate may have electrically conductive features constructed therein or thereon. Examples of polymeric materials that may be employed include polyamide, polyester, polystyrene, polyethylene (including polyethylene terephthalate, high density polyethylene and low-density polyethylene), polycarbonates (PC), polypropylene, polyvinyl chloride, bio-based plastics/biopolymers (e.g., polylactic acid), silicone, acrylonitrile butadiene styrene (ABS), or any combination thereof, such as PC/ABS (blends of polycarbonates and acrylonitrile butadiene styrenes). Composite substrates may be utilized. The composite may contain reinforcing materials, such as fibers or fillers commonly known in the art; two different polymeric materials, such as a thermoset core and a thermoplastic shell or thermoplastic edge about the periphery of the thermoset polymer; or conductive material disposed in a non-conductive polymer. The substrate may comprise or have at the edge of the plates a thermoplastic material that is bondable, preferably melt bondable. The one or more substrates may have one or more nonplanar structures. The one or more nonplanar structures may be integral with the substrate or affixed to the substrate. The one or more nonplanar structured may be molded as part of the substrate. The one or more nonplanar structures may include one or more raised edges, frames, inserts, protrusions, projections, openings, the like, or any combination thereof.

One or more substrates may have a raised edge about the periphery so as to facilitate stacking of the electrode plates and formation of electrochemical cells. The raised edge as used in this context means a raised edge on at least one of the two opposing surfaces of the plates. The raised edge may comprise a thermoplastic edge portion formed about another substrate material. The raised edge may function as separator plates as described herein. The substrate or periphery of the substrate may be a non-conductive material and may be a thermoplastic material. One or more substrates may include a frame. The frame may or may not include the raised edge. The frame about or integrated onto the substrate may be comprised of non-conductive material, such as a thermoplastic material. The use of non-conductive material enhances sealing the outside of the battery stack. The frame may include one or more assembly aids formed therein. The assembly aids may function to help align and retain one or more substrates, separators, or both in place while stacking to form the battery assembly. The assembly aids may include one or more projections, indentations, or both. For example, one or more male projections from one surface of a frame may align and sit within one or more female wells of a frame of an adjacent substrate and/or separator. The one or more female wells of a frame may be located on an opposite surface of the frame as the one or more male projections.

One or more of the electrode plates may include or be free of one or more current collectors. The one or more current collectors may function to dispose electrons flowing in the electrochemical cell, ensure electrical connection of one or more active materials to a substrate, collect current, or any combination thereof. The one or more current collectors may have any suitable form or shape to cooperate with one or more active materials of a substrate, transmit or receive electrons from one or more terminals, or both. The one or more current collectors may be in the form of a sheet, foil, grid, screen, mesh, the like, or any combination thereof. The one or more current collectors may be comprised of any one or more materials suitable for conducting current. The one or more materials may include one or more metals. The one or more metals may include silver, tin, copper, lead, alloys thereof, the like, or any combination thereof. The one or more materials may be chosen based on the one or more materials selected for the active material (e.g., cathode, anode, or both). For example, in a lead acid battery, the one or more current collectors may be comprised of lead, lead alloy, or both. The one or more current collectors may be located between a substrate and an active material, embedded within a substrate, embedded within an active material, in contact with a substrate, in contact with an active material, or any combination thereof. A current collector may be located between only a portion of or an entire surface of an active material facing toward a substrate. A current collector located between the entire surface of an active material and a substrate may provide for more efficient current collection and dispersion. The current collector has a thickness sufficient to collect electrons and transmit to current conductors, conduits, dispose electrons flowing through an electrochemical cell, or any combination thereof. For example, the thickness of the current conductor may be about 0.025 mm or greater to about 0.75 mm or less. One or more current collectors may be affixed to a surface of a substrate. Any suitable method of affixing a current collector to a substrate may be used which suitably holds the current collector to the substrate before and during repeat operation of the battery assembly. Suitable methods of affixing a current collector to a substrate may include welding, adhesive bonding, the like, or both. For example, a current collector may be bonded to the substrate via one or more adhesives. The one or more adhesives may include one or more epoxies, rubber cements, phenolic resins, nitrile rubber compounds, cyanoacrylate glues, the like, or a combination thereof. A suitable current collector is a lead foil from EppsteinFOILS GmBH & Co. KG having a thickness of 150 microns.

The battery assembly may further comprise or be free of one or more current conduits adapted to transmit electrons from one or more current conductors, current collectors, anodes, cathodes, terminals, or a combination thereof to one or more other current conductors, current collectors, anodes, cathodes, terminals, or a combination thereof. For example, one or more current conduits may be adapted to transmit electrons from a current collector and/or conductor in contact with a cathode to one or more positive terminals. As another example, one or more current conduits may be adapted to transmit electrons from one or more negative terminals to one or more current collectors and/or current conductors in contact with an anode. A typical bipolar battery flows electrons from cell to cell through the substrate. In this arrangement. either the substrate at least partially comprises a conductive material or comprises conductive pathways through the substrate. When the circuit is closed that contains the cells, electrons flow from cell to cell through the substrate to the positive terminal. It is contemplated that the assemblies may flow electrons through the substrates and cell, through a current collector to a current conductor, from a connection pad to a current conductor, from an anode and/or cathode to a current conductor, or any combination thereof. The current conduits of a battery assembly may be arranged in parallel, series, or a combination thereof. Exemplary arrangements of current conduits are described in U.S. patent application Ser. No. 15/802,737, incorporated herein by reference in its entirety.

The battery assembly may comprise one or more current conductors. The one or more current conductors may function to transmit electrons from one or more current collectors, current conduits, anodes, cathodes, substrates, or the like to or more other current conductors, collectors, conduits, anodes, cathodes, substrates, terminals, or a combination thereof. The one or more current conductors may function to transmit an electrical current from within an interior to an exterior of a stack of electrode plates, a battery assembly, or both. The one or more current conductors may be formed of one or more conductive materials. One or more conductive materials may include metal sheets, foils, screens, a plurality of wires arranged in a common plane, the like, or a combination thereof. One or more current conductors may be connected to, in direct contact with, or both one or more current conduits, current collectors, anodes, cathodes, connection pads, substrates, or a combination thereof. One or more current conductors may be in direct or indirect contact with a conductive substrate, nonconductive substrate, or both. An electrode plate may contain one or more current conductors disposed on at least a portion of one or more sides of one or more substrates, at least partially embedded within the substrate, or both. One or more sides may include one or more of the opposing surfaces suitable for having an anode or cathode disposed thereon, one or more peripheral surfaces of a substrate defining a perimeter, or both. The one or more current conductors may be directly or indirectly in contact with a substrate, frame, edge, or a combination thereof. One or more current conductors may include one or more negative current conductors, one or more positive current conductors, or a combination thereof. One or more current conductors may protrude from a stack of electrode plates, a membrane, an exterior casing, or a combination thereof to form one or more protruding portions. The protruding portions may be referred to as conductive tabs. A battery assembly may include one or more positive conductive tabs (e.g., protruding portions of one or more positive current conductors), one or more negative conductive tabs (e.g., protruding portions of one or more negative current conductors). The one or more current conductors may be substantially linear, non-linear, or a combination of both. The one or more current conductors may have a shape reciprocal with a shape of one or more current collectors, connection pads, or both. One or more portions of one or more current conductors embedded within one or more electrode plates, end plates, or both may be partially exposed by one or more openings in the electrode plates, end plates, or both. The one or more exposed portions may be in direct contact with one or more connection pads, current collectors, or both to be in electrical contact. A current conductor has surfaces opposing one another. One or both of the surfaces may be smooth, textured, or a combination of both. For example, a portion of a current conductor embedded within an electrode plate, end plate, or both may be substantially smooth while a portion of a current conductor protruding therefrom (e.g., conductive tab) may include one or more textured surfaces. A textured surface of a current conductor may include tapering, ridges, grooves, the like, or a combination thereof. One or more of the textured surfaces may be formed at uniform intervals or at random distances from each other. One or more textured surfaces may be provided where a current conductor meets with, abuts to, passes through, or a combination thereof with one or more electrode plates, end plates, membranes, terminal covers, the like, or a combination thereof. For example, a current conductor may taper to a narrower thickness where the current conductor is in contact with and passes through a membrane or terminal cover along its length and then widen to a larger width where it exits a membrane or terminal cover. As another example, a current conductor may widen in width where it is in contact with and passes through a membrane or terminal cover and then narrow in width where it exits a membrane or terminal cover. Either of these tapering variations, or other textured surfaces may be particularly beneficial in providing a seal about a current conductor as it is exposed outside of a stack of electrode plates. One or more current conductors may be in contact with a current conduit to transport current from or to one or more other collectors, conductors, anodes, cathodes, conductive substrates, connections pads, or a combination thereof to or from one or more terminals. One or more current conductors may include one or more end current conductors. One or more end current conductors may include an end negative current conductor, an end positive current conductor, or both. One or more end current conductors may be affixed to one or more end plates. The one or more end current conductors may be in direct and/or indirect contact with one or more terminals, buss bars, or both. For example, an end negative current conductor may protrude out of an end plate and be in electrical communication with a negative terminal via a terminal cover, buss bar, or both. For example, an end positive current conductor may protrude out of an end plate and be in electrical communication with a positive terminal via a terminal cover, buss bar, or both. One or more seals may be located about one or more current conductors where the conductor protrudes from an end plate, terminal cover, membrane, or a combination thereof. The one or more seals may include any suitable sealing material between the current conductor and the end plate, terminal cover, membrane, or a combination thereof. The sealing material may include one or more gaskets. The one or more seals may also be formed by melt bonding the conductor to the terminal cover, membrane, end plate, or a combination thereof. The one or more seals may aid in preventing leaking of electrolyte, gasses, and the like during evacuation, filling, and/or operation of the battery assembly.

One or more current conductors may be in electrical communication with one or more connection pads. The connection pads may function to transfer an electrical current from within one or more electrochemical cells to an exterior of an electrochemical cell, to a tab portion of a current conductor, or both. The one or more connection pads may provide a larger surface area to receive an electrical current. The one or more connection pads may allow the battery assembly to more efficiently distribute electrical energy in high power applications. The one or more connection pads may comprise one or more conductive materials. Suitable conductive materials may be those as described for a current collector. The one or more connection pads may include a single connection pad or a plurality of connection pads. The one or more connection pads may be located on and/or embedded within a surface of one or more electrode plates. The one or more electrode plates may include an end plate, a monopolar plate, a bipolar plate, dual polar plate, or any combination thereof. The one or more connection pads may be located on, affixed to, and/or embedded in an inwardly facing surface of one or more end plates and/or monopolar plates. The one or more connection pads may be located within an interior surface between a plurality of openings of an end plate, monopolar plate, or both. The one or more connection pads may be located in one or more windows (e.g., openings) within a surface of an end plate, electrode plate, or both. The one or more windows may have a shape reciprocal with a shape of the one or more connection pads. The windows may allow for the one or more connection pads to be in electrical contact with one or more current conductors, current collectors, or both. The one or more connection pads may have a similar shape and/or size as one or more current collectors, current conductors, current conduits, or a combination thereof. The one or more connection pads may be utilized in place of, in conjunction with, or be one or more current collectors of one or more of the electrode plates. The one or more connection pads may be utilized in conjunction with or instead of one or more current collectors of one or more end plates. The one or more connection pads may be located between a cathode or anode and a substrate. The one or more connection pads may be located between a current collector and a substrate, between a current collector and a current conductor, or a combination of both. The one or more connection pads may have a shape and/or size smaller than, about equal to, or even greater than a shape and/or size of a portion of one or more current conductors located within an electrode plate. The one or more current conductors and/or connection pads may have a shape which is generally square, rectangular, L-shaped, J-shaped, I-shaped, T-shaped, or a combination thereof. A shape which is non-linear or having a plurality of linear portions may resist pulling or removal of the current conductor from an electrode plate. For example, an L-shape better resists pulling as the additional linear portion may be located perpendicular to a removal direction of the current conductor and thus resists movement of the current conductor from the electrode plate.

One or more of the electrode plates may include a cathode. The cathode can be in any material that is capable of functioning as a cathode in a battery and can be in any form commonly used in batteries. A bipolar plate may include a cathode on a surface opposing a surface having an anode deposited thereon and opposing an anode of either another bipolar plate or monopolar plate. A monopolar plate may have a cathode deposited on a surface opposing a surface bare of either a cathode or anode, opposing a surface adjacent to an end plate, or both. The cathode is also referred to as positive active material (PAM). The positive active material may comprise a composite oxide, a sulfate compound or a phosphate compound of lithium, lead, carbon or a transition metal generally used in a lithium ion, nickel metal hydride or lead acid secondary battery. Examples of the composite oxides include Li/Co based composite oxide such as $LiCoO_2$, Li/Ni based composite oxide such as $LiNiO_2$, Li/Mn based composite oxide such as spinel $LiMn_2O_4$, and Li/Fe based composite materials such as $LiFeO_2$. Exemplary phosphate and sulfur compounds of transition metal and lithium include $LiFePO_4$, $V_2O_5$, $MnO_2$, $TiS_2$, $MoS_2$, $MoO_3$, $PbO_2$, AgO, NiOOH, and the like. The cathode material can be in any form which allows the cathode material to function as a cathode in an electrochemical cell. Exemplary forms include formed parts, in paste form, pre-fabricated sheet or film. For lead acid in batteries, the preferred cathode material is lead dioxide ($PbO_2$).

One or more of the electrode plates may include an anode. The anode can be any material that is capable of functioning as an anode in a battery and can be in any form commonly used in batteries. A bipolar plate may include an anode on a surface opposing a surface having a cathode deposited thereon and opposing cathode of either another bipolar plate or monopolar plate. A monopolar plate may have an anode deposited on a surface opposing a surface bare of either a cathode or anode, opposing a surface adjacent to an end plate, or both. The anodes are also referred to as negative active material (NAM). The anode material may include any material used in secondary batteries, including lead acid, nickel metal hydrides and lithium ion batteries. Exemplary materials useful in constructing anodes include lead, composite oxides of carbon or lithium and transition metals, (such as a composite oxide of titanium oxide or titanium and lithium) and the like. Exemplary forms include formed parts, in paste form, pre-fabricated sheet or films. Paste compositions can contain a number of beneficial additives including floc or glass fibers for reinforcement, various ligano-organic compounds for paste stability and conductive additives such as carbon, particularly for negative active materials. For lead acid batteries, the preferred form of the anode material is sponge lead. The anode and cathode are chosen to work together to function as an electrochemical cell once a circuit is formed which includes the electrochemical cells.

A battery assembly may include one or more electrochemical cells (e.g., cells). An electrochemical cell may be formed by a pair of opposing electrode plates with an opposing anode and cathode pair therebetween. One or more electrochemical cells may be sealed. The space of an electrochemical cell (i.e., between an opposing anode and cathode pair) may contain one or more separators, transfer sheets, electrolyte, or a combination thereof. E Exemplary configurations of electrochemical cells are described in U.S. patent application Ser. No. 15/359,289 and PCT Application No. PCT/US2018/033435, incorporated herein by reference in their entirety. The electrochemical cells may be sealed through one or more seals formed about one or more channels; one or more frames and/or edges of electrode plate, separators, or both; or any combination thereof which may form closed electrochemical cells. The closed electrochemical cells may be sealed from the environment to prevent leakage and short circuiting of the cells.

The battery assembly may include or be free of one or more separators. The one or more separators may function to partition an electrochemical cell (i.e., separate a cathode of an electrochemical cell from an anode of an electrochemical cell); prevent short circuiting of the cells due to dendrite formation; allow liquid electrolyte, ions, electrons or any combination of these elements to pass through; or any combination thereof. Any known battery separator which performs one or more of the recited functions may be utilized in the battery assemblies of the present teachings. One or more separators may be located between anode and a cathode of an electrochemical cell. One or more separators may be located between a pair of adjacent electrode plates, which may include between bipolar plates or between a bipolar plate and a monopolar plate. The separator may be prepared from a non-conductive material, such as porous polymer films, glass mats, porous rubbers, ionically conductive gels or natural materials, such as wood, and the like. The separator may contain pores or tortuous paths through the separator which allows electrolyte, ions, electrons or a combination thereof to pass through the separator. The pores may be sized as described in PCT Application No. PCT/US2018/033435 with respect to the pores of the transfer sheet. Among exemplary materials useful as separators are absorbent glass mats, and porous ultra-high molecular weight polyolefin membranes and the like. The separators may be attached about their periphery and/or interior to one or more end plates, electrode plates, other separators, or any combination thereof. The separators may have a cross-section or surface area that is greater than the area of the adjacent cathode and anode. A larger area may allow for isolation of the anode from the cathode of the same electrochemical cell. The separator may completely separate the cathode portion of the cell from the anode portion of the cell. The edges of the separator may contact peripheral edges of adjacent electrode plates. The edges of the separator, electrode plate, or both may not have an anode or cathode disposed thereupon, so as to completely separate the anode portion of the cell from the cathode portion of the cell. The use of one or more transfer sheets within an electrochemical cell may allow for the electrochemical cell to be free of a separator if desired.

One or more separators may include frames. The frames may function to match with the edges or frames of adjacent electrode plates and form a seal between the electrochemical cells and the outside of the battery. The frame may be attached to or integral with a separator. The frame can be attached to the separator about the periphery of the sheet forming the separator using any means that bonds the separator to the frame and which can withstand exposure to the electrolyte solution. For example, the frame may be attached by adhesive bonding, melt bonding or molding the frame about the periphery of the separator. The frame can be molded in place by any known molding technic, for example thermoforming, injection molding, roto molding, blow molding, compression molding and the like. The frame may be formed about the separator sheet by injection molding. The frame may contain a raised edge adapted to match raised edges disposed about the periphery of the substrates for the electrode plates. Raised edges in one or both of the electrode plate substrates and the frames of the separators can be matched to form a common edge for the battery stack and to enhance the seal between the electrochemical cells and the outside of the battery. To seal about edges of the plurality of electrode plates and one or more separators to prevent leakage of an electrolyte and evolved gasses from the electrochemical cells, isolate the electrochemical cells to prevent short-circuiting, the battery assembly may be sealed using an endo or exoskeleton sealing system as disclosed in commonly owned US Patent Publication Nos. 2010/0183920, 2014/0349147, 2015/0140376, and 2016/0197373 incorporated in their entirety by reference.

The battery assembly may include one or more inserts. One or more inserts may include a plurality of inserts. One or more inserts may be referred to or include one or more inserts, bosses, raised surfaces, the like, or a combination thereof. The one or more inserts may function to interlock with one or more other inserts, define a portion of one or more channels passing through the stack, form leak proof seal along one or more channels, cooperate with one or more valves, or any combination thereof. One or more inserts may be part of one or more end plates, electrode plates, separators, or any combination thereof. One or more inserts may be free of active material, transfer sheet, or both. The one or more inserts may have any size and/or shape to interlock with one or more inserts of an electrode plate, end plate, separator, or combination thereof; form a portion of a channel, form a leak proof seal along one or more channels, cooperate with one or more valves, or any combination thereof. The one or more inserts may be formed or attached to an end plate, substrate of an electrode plate, separator, or combination thereof. The one or more inserts may be located within the periphery of an electrode plate, separator, end plate, or combination thereof. One or more inserts may project from a surface of a substrate, separator, end plate, or combination thereof thus forming one or more raised inserts. One or more inserts may project from a substrate of an electrode plate, a central portion of a separator, or both. One or more inserts may project substantially orthogonally or oblique from a surface of the substrate, separator, end plate, or combination thereof. One or more inserts may be attached to or integral with a portion of the electrode plate, separator, end plate, or combination thereof. An insert which is integral with and projects from a surface may be defined as a boss. The opposing surface from which the insert projects therefrom may have a reciprocal indentation to allow forming of the boss. The reciprocal indentation may receive another insert therein, thus allowing formation of a channel. The one or more inserts may have one or more openings therethrough. The one or more inserts may be concentric and formed about one or more openings. One or more inserts may extend a length of an opening. A sealing surface may be formed between the outer diameter of one or more openings and an interior of one or more inserts. For example, a surface of the substrate, end plate, and/or separator may be substantially perpendicular to a longitudinal axis of the battery assembly located between an insert and an opening may be a sealing surface. One or more inserts may be capable of interlocking with one or more inserts of an adjacent electrode plate, separator, and/or end plate to form a leak proof seal about a channel. For example, one or more electrode plates may be machined or formed to contain matching indents, on a surface opposite from an insert, for bosses, inserts, sleeves, or bushings of a separator, electrode plate, and/or end plate. One or more suitable inserts may be those disclosed in U.S. Pat. Nos. 8,357,469; 9,553,329; and US Patent Application Publication No. 2017/0077545; incorporated herein by reference in their entirety for all purposes. One or more inserts may contain one or more vent holes. One or more inserts of one or more separators may contain one or more vent holes. The one or more vent holes may allow communication of selected fluids from one or more electrochemical cells to one or more channels. One or more vent holes may allow transmission of gasses from one or more electrochemical cells to one or more channels and prevent the transmission of one or more liquids (i.e., an electrolyte) from one or more electrochemical cells to one or more channels. Each of the electrochemical cells may be independently electrochemically formed.

The battery assembly may include one or more openings. The one or more openings may include a plurality of openings. The openings may function to form one or more channels; house one or more seals; affix one or more end plates, electrode plates, separators, or combination thereof to one another; or any combination thereof. The one or more openings may be formed in one or more of the end plates, electrode plates, separators, active material, transfer sheets, or any combination thereof. One or more openings of an end plate, electrode plate, separator, active material, transfer sheet, or combination thereof may align (i.e., be substantially concentric) with one or more openings of one or more other end plates, electrode plates, separators, active material, transfer sheet, or any combination thereof. The one or more openings may align in a transverse direction across the length of the battery assembly. The transverse direction may be substantially parallel to a longitudinal axis of the battery assembly. The transverse direction may be substantially perpendicular the opposing surfaces of the substrates upon which a cathode and/or anode may be deposited. The openings may be machined (e.g., milled), formed during fabrication of the substrate (e.g., by a molding or shaping operation), or otherwise fabricated. Openings in a paste may be formed during a past application process. The openings may have straight and/or smooth internal walls or surfaces. The size and frequency of the openings formed in the substrate may affect the resistivity of the battery. The one or more openings may have a diameter able to receive a post therethrough. One or more openings in an active material and/or transfer sheet may have a diameter able to receive a post, an insert, or both therethrough. The openings may have a diameter of about 0.2 mm or greater, about 1 mm or greater, about 2 mm or greater, or even about 5 mm or greater. The openings may have a diameter of about 30 mm or less, about 25 mm or less, or even about 20 mm or less. One or more openings of a transfer sheet and/or active material (e.g., paste) may have a diameter larger than a diameter of an opening and/or insert of a separator, substrate, electrode plate, end plate, or combination thereof. One or more openings of an electrode plate and/or substrate may have a larger diameter than one or more other openings of the same electrode plate and/or substrate. An opening may be about at least about 1.5 times, at least about 2 times, or even at least about 2.5 times larger than another opening. An opening may be about 4 times or less, about 3.5 times or less, or even about 3 times or less large than another opening. The openings may be formed having a density of at least about 0.02 openings per cm2. The openings may be formed having a density of less than about 4 openings per cm2. The openings may be formed having a density from about 2.0 openings per cm2 to about 2.8 openings per cm2.

One or more openings may be filled with an electrically conductive material, e.g., a metallic-containing material. The electrically conductive material may be a material that undergoes a phase transformation at a temperature that is below the thermal degradation temperature of the substrate so that at an operating temperature of the battery assembly that is below the phase transformation temperature, the dielectric substrate has an electrically conductive path via the material admixture between the first surface and the second surface of the substrate. Further, at a temperature that is above the phase transformation temperature, the electrically conductive material admixture undergoes a phase transformation that disables electrical conductivity via the electrically conductive path. For instance, the electrically conductive material may be or include a solder material, e.g., one comprising at least one or a mixture of any two or more of lead, tin, nickel, zinc, lithium, antimony, copper, bismuth, indium, or silver. The electrically conductive material may be substantially free of any lead (i.e., it contains at most trace amounts of lead) or it may include lead in a functionally operative amount. The material may include a mixture of lead and tin. For example, it may include a major portion tin and a minor portion of lead (e.g., about 55 to about 65 parts by weight tin and about 35 to about 45 parts by weight lead). The material may exhibit a melting temperature that is below about 240° C., below about 230° C., below about 220° C., below 210° C. or even below about 200° C. (e.g., in the range of about 180 to about 190° C.). The material may include a eutectic mixture. A feature of using solder as the electrically conductive material for filling the openings is that the solder has a defined melting temperature that can be tailored, depending on the type of solder used, to melt at a temperature that may be unsafe for continued battery operation. Once the solder melts, the substrate opening containing the melted solder is no longer electrically conductive and an open circuit results within the electrode plate. An open circuit may operate to dramatically increase the resistance within the bipolar battery thereby stopping further electrical flow and shutting down unsafe reactions within the battery. Accordingly, the type of electrically conductive material selected to fill the openings can vary depending on whether it is desired to include such an internal shut down mechanism within the battery, and if so at what temperature it is desired to initiate such an internal shutdown. The substrate may be configured so that in the event of operating conditions that exceed a predetermined condition, the substrate will function to disable operation of the battery by disrupting electrical conductivity through the substrate. For example, the electrically conductive material filling holes in a dielectric substrate will undergo a phase transformation (e.g., it will melt) so that electrical conductivity across the substrate is disrupted. The extent of the disruption may be to partially or even entirely render the function of conducting electricity through the substrate disabled. Suitable electrically conductive material is described in U.S. Pat. No. 8,357,469 which is incorporated herein by reference in its entirety.

The battery assembly may include one or more channels. The one or more channels may function as one or more venting, filling, and/or cooling channels; house one or more posts; distribute one or more posts throughout an interior of the battery assembly; prevent liquid electrolyte from coming into contact with one or more posts or other components; or any combination thereof. The one or more channels may be formed by one or more openings of one or more end plates, electrode plates, and/or separators, which are aligned. The one or more channels may extend through one or more openings of active material, transfer sheets, or both. The one or more channels may be referred to as one or more integrated channels. The one or more channels may pass through one or more electrochemical cells. The one or more channels may pass through a liquid electrolyte. The channels may be sealed to prevent electrolytes and gasses evolved during operation from entering the channels. Any method of sealing which achieves this objective may be utilized. One or more seals, such as inserts of the one or more end plates, electrode plates, and separators, may interlock and surround one or more channels to prevent the liquid electrolyte from leaking into one or more channels. The one or more channels may pass through the battery assembly in a transverse direction to form one or more transverse channels. The size and shape of the channels can be any size or shape that allows them to house one or more posts. The shape of the channels may be round, elliptical, or polygonal, such as square, rectangular, hexagonal and the like. The size of the channels housing one or more posts is chosen to accommodate the posts used. The diameter of the channel may be equal to the diameter of the openings which align to form one or more channels. The one or more channels comprise a series of openings in the components arranged so a post can be placed in the channel formed, so a fluid can be transmitted through the channel for cooling, and/or for venting and filling. The number of channels is chosen to support the end plate and edges of the end plates, electrode plates, and separators to prevent leakage of electrolyte and gasses evolved during operation, and to prevent the compressive forces arising during operation from damaging components and the seal for the individual electrochemical cells. A plurality of channels may be present so as to spread out the compressive forces generated during operation. The number and design of channels is sufficient to minimize edge-stress forces that exceed the fatigue strength of the seals. The locations of a plurality of channels are chosen so as to spread out the compressive forces generated during operation. The channels may be spread out evenly through the stack to better handle the stresses. The plurality of channels may have a cross-sectional size of about 2 mm or greater, about 4 mm or greater, or about 6 mm or greater. The upper limit on the cross-sectional size of the channels is practicality. If the size is too large, the efficiency of the assemblies is reduced. The channels may have a cross-sectional size of about 30 mm or less, about 25 mm or less, or even about 20 mm or less.

The battery assembly may include one or more posts. The one or more posts may function to hold the stack of components together in a fashion such that damage to components or breaking of the seal between the edges of the components of the stack is prevented, ensure uniform compression across the separator material, and ensure uniform thickness of the separator material. The one or more posts may have on each end an overlapping portion which engages the outside surface of opposing end plates, such as a sealing surface of each end plate. The overlapping portion may function to apply pressure on outside surfaces of opposing end plates in a manner so as to prevent damage to components or breaking of the seal between the edges of the components of the stack, and prevent bulging or other displacements of the stack during battery operation. The overlapping portion may be in contact with a sealing surface of an end plate. The stack may have a separate structural or protective end-piece over the monopolar end plate and the overlapping portion will be in contact in with the outside surface of the structural or protective end-piece. The overlapping portion can be any structure that in conjunction with the post prevents damage to components or breaking of the seal between the edges of the components of the stack. Exemplary overlapping portions include bolt heads, nuts, molded heads, brads, cotter pins, shaft collars and the like. The posts are of a length to pass through the entire stack but such length varies based on the desired capacity of the battery. The posts may exhibit a cross-section shape and size so as to fill a channel. The posts may have a cross-sectional size greater than the cross-sectional size of one or more channels so that the posts form an interference fit one or more of the channels. The number of posts is chosen to support the end plate and edges of the substrates to prevent leakage of electrolytes and gasses evolved during operation and to prevent the compressive forces arising during operation from damaging components and the seal for the individual electrochemical cells and to minimize edge-stress forces that exceed the fatigue strength of the seals. The plurality of posts may be present so as to spread out the compressive forces generated during operation. There may be fewer posts than channels where one or more of the channels are utilized as cooling channels or vent/fill channels. For example, there may be four channels with three channels having a post located therein and one channel may be used as a cooling, vent, and/or fill channel. The posts may comprise any material that performs the necessary functions. If the post is utilized to seal the channels, then the material used is selected to withstand the operating conditions of the cells will not corrode when exposed to the electrolyte and can withstand the temperatures and pressures generated during operation of the cells. Where the posts perform the sealing function, the posts may comprise a polymeric or ceramic material that can withstand the conditions recited. Where posts aid in sealing, the material is preferred to be non-conductive to prevent shorting out of the cells. The posts may comprise a polymeric material such as a thermoset polymer or a thermoplastic material. The posts may comprise a thermoplastic material. Exemplary thermoplastic materials include ABS (acrylonitrile-butadiene-styrene copolymers), polypropylene, polyester, thermoplastic polyurethanes, polyolefins, compounded thermoplastic resins, polycarbonates and the like. ABS is most preferred. Where the channels are separately sealed the posts can comprise any material that has the structural integrity to perform the desired functions. Of the polymeric materials recited above, ceramics and metals may be utilized. Suitable metals may be steel, brass aluminum, copper and the like. The posts can comprise molded posts, threaded posts or posts with one or more end attachments. The posts may be bonded to parts of the stacks, for example the substrates, inserts or bosses in the channels, and the like. The bonds can be formed from adhesives or fusion of the polymeric materials, such as thermoplastic materials. The one or more openings may have threaded surfaces. If threaded, the one or more posts may also be threaded to engaged with the threaded openings. Posts may include a head or nut on one end opposing a nut, hole for a brad, cotter pin, the like, or a combination thereof. This is generally the case for non-molded posts. The posts may be constructed in such a way as to be a one way ratcheting device that allows shortening, but not lengthening. Matching nuts and/or washers may be used with posts so as to compress the plates they are adjacent to when in place. If the post is molded, it can be molded separately or in place. If molded in place, in situ, a seal may need to be present in the channel to hold the molten plastic in place. The seal may be formed by the interlocking inserts, a separate seal therein, or both. A nonconductive post which is threaded may be used and can provide the necessary seal. Alternatively, a pre-molded nonconductive polymeric post may be designed to form an interference fit in the channel in a manner so as seal the channels.

The battery assembly may comprise a seal between one or more channels and one or more posts. One or more seals may be located in a channel, about an exterior of a channel, and/or about a post. The seal may comprise any material or form that prevents electrolyte and gasses evolved during operation from leaking from the electrochemical cells. The seal can be a membrane, sleeve, or series of matched inserts in the end plates, electrode plates, and/or separators, or inserted in the channel. The membrane can be elastomeric. The channel can be formed by a series of sleeves, bushings, inserts and/or bosses, inserted or integrated into the plates and/or separators. The seal can be prepared from any material that can withstand exposure to the electrolyte, operating conditions of the electrochemical cells and forces exerted by inserting the post or by the post in the channel. Suitable material for one or more seals includes the polymeric materials that are described as useful for the posts and the substrates. The seal may be formed by sleeves, inserts or bushings placed between the electrode plates. The sleeves or inserts may be relatively rigid and the bushings may be generally elastomeric. The inserts, bosses, sleeves and/or bushings may be adapted to fit within indentations in the electrode plates and/or separators or to have ends that insert into the openings of the plates creating one or more channels. The electrode plates can be formed or machined to contain matching indents for the bosses, inserts, sleeves and/or the bushings. Assembly of the stack of plates with the bosses, inserts, sleeves or bushings may create interference fits to effectively seal the channels. Alternatively, the bosses, inserts, sleeves and/or bushings may be melt bonded or adhesively bonded to the plates so as from a seal at the junction. Alternatively, the bosses, inserts, sleeves and/or bushings may be coated in the inside with a coating which functions to seal the channel. As mentioned above, the posts can function to seal the channels. It is contemplated that a combination of these sealing solutions may be utilized in single channel or in different channels. Where separators are present they generally have a similar structure as the electrode plates to accommodate the formation or creation of the transverse channels. The seal may be a thermoset polymer, such as an epoxy, polyurethane or acrylic polymer injected between the bolt and the transverse channel. One or more channels may be formed by inserts, bosses, sleeves and/or bushings bonded to, in openings, and/or integral with openings in one or more electrode plates and/or one or more separators. One or more posts in one or more channels may apply sufficient pressure to hold inserts, holes, bosses, sleeves and/or bushings in place to form a sealed passage. The one or more channels may be formed from inserts and/or bosses bonded and/or integrated into one or more electrode plates and one or more separators. One or more posts may be bonded to one or more inserts, bosses and/or substrates of the battery by an adhesive bond or by fusion of thermoplastic polymers or both. The inserts and/or bosses may be inserted one or more electrode plates and/or separators by interference fit or bonded in place by an adhesive.

The battery assembly of the disclosure may include one or more end plates. The one or more end plates may function to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may have any size, shape, and/or configuration to reinforce one or more electrode plates, resist or prevent both outward and inward deformation of one or more electrode plates due to pressure differentials within a battery assembly compared to the external environment, prevent semi-permanent or permanent damage to one or more electrode plates, ensure interlocked components which create a seal remain sealed, or any combination thereof. The one or more end plates may or may not be an electrode plate, terminal cover, or both. For example, one or more end plates may be one or more monopolar plates. Alternatively, the one or more end plates may be adjacent to one or more electrode plates, such as a monopolar plate. As another example, the one or more end plates may also be a terminal cover. And even further, one or more end plates may be both a monopolar plate and a terminal cover. The one or more end plates may be attached to one or more electrode plates at opposing ends of a stack. For example, a stack may include a first end plate at an opposing end of the stack as a second end plate. The one or more end plates may be sufficiently rigid to resist outward bulging created by temperatures and pressures within a battery assembly during operation, resist inward bending during pulling of a vacuum inside of the battery assembly, or both. The end plate may include a base, an internal reinforcement structure, one or more openings, one or more raised inserts, one or more attachment mechanisms, or any combination thereof.

The one or more end plates may include a base. The base may function to affix the end plate to one or more electrode plates, provide reinforcement to one or more electrode plates, distribute a deformation load across one or more electrode plates, serve as a carrier for an internal reinforcement structure, or any combination thereof. The base may have any size, shape, and/or configuration to perform any combination of the desired functions. The base may take on the general cross-sectional shape of the end of the battery assembly where it may be located. The base may be generally shaped like a cube, rectangular prism, cylinder, cone, pyramid, sphere, the like, or any combination thereof. For example, the base may have a generally cube and/or rectangular prism shape. The base may have a shape and/or cross-section substantially similar to one or more electrode plates. The base may include generally planar and/or non-planar surfaces. The base may have a generally uniform or non-uniform thickness. The base may be adjacent to an electrode plate, such as a monopolar plate. The base may be distanced from and/or in contact with an adjacent electrode plate. The base may be part of an electrode plate, such as a substrate. A substantially planar surface of the base, opposite an internal reinforcement structure, or the internal reinforcement structure may face a surface of an electrode plate, such as a surface free of a cathode or anode material. The base may have a thickness sufficient to cooperate with an internal reinforcement structure to distribute a deformation load across one or more electrode plates to prevent outward bulging and inward bending of an adjacent electrode plate. The thickness of the base may be the distance between two opposing surfaces of the base substantially perpendicular to a longitudinal axis of the battery assembly. A longitudinal axis may orthogonally intersect one or more cathode and/or anode bearing surfaces of a plurality of electrode plates. An internal reinforcement structure, attachment of the base to an adjacent electrode plate about both a periphery and an interior, and a seal structure of the plurality of electrode plates may allow the base to have a smaller thickness compared to bulkier end plates. The end plate with a reinforcement structure may have thickness about 80% or less, about 70% or less, or even 60% or less than a traditional end plate without an internal reinforcement structure. The end plate with a reinforcement structure may have thickness about 25% or greater, about 35% or greater, or even 45% or greater than a traditional end plate without an internal reinforcement structure. The seal structure of the plurality of electrode plates may include one or more inserts, bosses, frames, raised edges, or any other seal as described herein. The base may have a thickness of about 1 mm or more, about 3 mm or more, or even about 5 mm or more. The base may have a thickness of about 15 mm or less, about 10 mm or less, or even about 8 mm or less. The base may include an internal reinforcement structure, one or more openings, one or more inserts, one or more attachment mechanisms, one or more sealing surfaces, one or more recessed portions, or any combination thereof.

One or more end plates may include an internal reinforcement structure. The internal reinforcement structure may function to provide additional strength, distribute deformation loads, increase durability, reduce thickness, reduce weight, or any combination thereof of an end plate, an electrode plate, or any combination thereof. The internal reinforcement structure may have any size, shape, and/or configuration to provide any combination of the desired features. The internal reinforcement structure may result in one or more end plates having a stiffness of about 200 ksi or greater, about 400 ksi or greater, or even about 500 ksi or greater. The internal reinforcement may result in one or more end plates having a stiffness of about 1500 ksi or less, about 1200 ksi or less, or even about 1000 ksi or less. The internal reinforcement structure may distribute deformation loads received by the base from one or more electrode plates. Deformation loads may be understood as the forces experienced by the one or more electrode plates, such as when a vacuum is pulled in the battery assembly and/or by pressures generated within the battery assembly during operation. The internal reinforcement structure may distribute deformation loads substantially uniform across the base. By distributing the deformation load, the internal reinforcement structure may resist outward bulging or inward bending of the end plate which may result in resisting outward bulging or inward bending of an electrode plate adjacent to the end plate due to being attached. As one or more electrode plates adjacent to one or more end plates, such as opposing monopolar plates, resist deformation, one or more electrode plates located therebetween are prevented from deforming. The internal reinforcement structure may be distributed across a surface of the base, be localized in regions of a surface of the base, or both. The internal reinforcement structure may include one or more internal reinforcement structures, such as a plurality of internal reinforcement structures. Exemplary internal reinforcement structures may include one or more rib structures, one or more cells, one or more inserts, one or more openings, one or more attachment mechanisms, the like, or any combination thereof. The internal reinforcement structure may include one or more strengthening materials to provide reinforcement to an end plate. Exemplary strengthening materials may include additives, such as fibers, composite materials, the like, or both.

An internal reinforcement structure may include one or more rib structures. The one or more rib structures may function to distribute one or more deformation loads throughout an end plate, providing light weight reinforcement to a base of an end plate, provide reinforcement to one or more inserts, openings, and/or channels, or any combination thereof. The one or more rib structures may have any size, shape, and/or configuration to provide one or more of the preceding functions. The one or more rib structures may be integral with or attached to a base of an end plate. The one or more rib structures may be integrally formed through compressive forming, tensile forming, molding, or the like, or any combination thereof. Compressive forming may include die forming, extrusion, indenting, the like, or any combination thereof. Molding may include injection molding. The one or more rib structures may be attached to a base of an end plate by an adhesive, melt bonding, or the like. The one or more rib structures may include one or more ribs, one or more gussets, one or more projections, one or more posts, the like, or any combination thereof which are able to distribute or absorb at least part of a deformation load. The one or more rib structures may be planar, non-planar or a combination of both. The one or more rib structures may be located on any surface of a base of an end plate. The one or more rib structures may be located on a surface of a base substantially perpendicular to a longitudinal axis of a battery assembly. The one or more rib structures may project from a surface of the base. One or more rib structures may project at a perpendicular and/or orthogonal angle. The one or more rib structures may be located about a periphery of the base, an interior of the base, or both. For example, an outer reinforcement rib may project from a surface of the base and be located about at least a portion of a peripheral edge of the base. An outer reinforcement rib may define a periphery and/or an interior of an end plate or base. A periphery of the end plate or base may be the outer edge of the end plate including the outer reinforcement rib. An interior of the end plate or base may be defined as the portion of the end plate or base located within a periphery. The one or more rib structures may form a repetitive pattern, may be staggered, may be off-set, or any combination thereof on a surface of the base. For example, a plurality of rib structures may form an intersecting pattern, such as a lattice, grid, and/or honeycomb structure across a surface of the base. One or more rib structures may form a pattern within an interior of the base. One or more rib structures may be substantially parallel to one or more other rib structures, a portion of an outer reinforcement structure, or both. One or more rib structures may intersect and/or merge with one or more other rib structures, inserts, and/or openings substantially perpendicularly and/or obliquely. The one or more rib structures may include one or more latitudinal rib structures, longitudinal rib structures, or both. Latitudinal and longitudinal rib structures may be defined as rib structures which intersect substantially perpendicular to one another.

The one or more rib structures may have a height, a width, and a thickness. A height of a rib structure may be a distance from an end of a rib structure adjacent to the base to an opposing end of the rib structure. One or more rib structures may have a same or differing height as one or more other rib structures. One or more rib structures may have a substantially uniform height or a non-uniform height along its length. One or more rib structures may have a height of about 1 mm or more, about 3 mm or more, or even about 5 mm or more. One or more rib structures may have a height of about 15 mm or less, about 12 or less, or even about 10 mm or less. A length of a rib structure may be from one end of a rib structure attached to another rib structure to an opposing end of the rib structure. One or more rib structures may have a substantially same or differing length as one or more other rib structures. One or more rib structures may have a length about less than, equal to, or greater than a length or width of a base of the end plate. One or more rib structures may have a length about equal to a length or width of a base at a peripheral edge. One or more rib structures may have a length about equal to an interior length or width of a base. One or more rib structures may have a length which extends from one rib structure, insert, or opening to another rib structure, insert, an opening. One or more rib structures may have a length of about 1 mm, mm or more, about 10 mm or more, or even about 25 mm or more. One or more rib structures may have a length of about 300 mm or less, about 250 mm or less, or even about 150 mm or less. A thickness of a rib structure may be the distance between two planar surfaces of the rib structure, two surfaces of the rib structure facing other rib structures, two surfaces of a rib structure facing adjacent cells, or any combination thereof. One or more rib structures may have a same or differing thickness as one or more other rib structures. One or more rib structures may have a thickness which is substantially uniform along its length or non-uniform. One or more rib structures may have a thickness of about 0.5 mm or more, about 1 mm or more, or even about 3 mm or more. One or more rib structures may have a thickness of about 15 mm or less, about 12 or less, or even about 10 mm or less. The one or more rib structures may cover a density of a surface of the base, such that a certain percentage of the surface includes one or more rib structures. About 5% or greater, about 10% or greater, or even about 20% or greater of an area of a surface of the base may include one or more rib structures. About 80% or less, about 70% or less, or even about 50% or less of an area of a surface of the base may include one or more rib structures.

The one or more rib structures may form one or more cells. The one or more cells may function to provide a reinforced end plate without a bulky reinforcement structure. One or more cells may be defined where a plurality of rib structures adjoin or are integral with one another to define a continuous wall. For example, two longitudinal rib structures and two latitudinal rib structures may intersect and or adjoin one another to form a cell with a continuous wall. For example, an outer reinforcement rib structure and a plurality of latitudinal or longitudinal rib structures may intersect and or adjoin one another for form a cell with a continuous wall. One or more cells may expose a surface of the base, such as a surface from which one or more rib structures project. One or more cells may be located within an interior of the end plate. One or more cells may have a cross-sectional area. The cross-sectional area may be defined as the area formed between a plurality of rib structures. The cross-sectional area may be defined as the area formed within a continuous wall. A cross-sectional area may be a cross-section of a cell substantially parallel to a surface of the base from which one or more rib structures project. One or more cells may have a cross-sectional area smaller than, equal to, or larger than one or more other cells. The cross-sectional area may be about 10 mm2 or more, about 50 mm2 or more, or even about 150 mm2 or more. The cross-sectional area may be about 1000 mm2 or less, about 750 mm2 or less, or even about 650 mm2 or less. One or more cells may include one or more openings one or more attachment mechanisms, or both.

One or more end plates may include one or more openings. The one or more openings may function to provide an opening for an attachment mechanism to pass therethrough; cooperate with one or more electrode plates and/or inserts to form part of a channel; allow for a vacuum pulling, filling, and/or venting of the battery assembly; or any combination thereof. The one or more openings may have any size, shape, and/or configuration to provide any combination of the desired functions. The one or more openings may have any combination of the features as described for openings and/or holes in one or more electrode plates and/or substrates. One or more openings of one or more end plates may align (i.e., be concentric) with one or more openings of one or more electrode plates and/or separators so as to form one or more channels. One or more openings may have a shape or size similar to one or more openings of an electrode plate adjacent to the end plate. The one or more openings may have a cross-sectional shape which functions to receive an attachment mechanism, receive a post, cooperate with an insert, or any combination of the desired functions of the openings. The one or more openings may have a cross-section shape which is generally rectangular, square, circular, triangular, elliptical, ovular, or any combination thereof. The one or more openings may have a cross-sectional width sufficient to receive one or more attachment mechanisms, one or more posts, one or more valves, or any combination thereof. One or more openings may have a cross-sectional width less than, equal to, or greater than a diameter of one or more openings formed within the same end plate and/or an adjacent electrode plate. A cross-sectional width of one or more openings may be continuous, taper, or expand along a length of an opening. The one or more openings may have a cross-sectional width of about 1 mm or more, about 3 mm or more, or even about 5 mm or more. The one or more openings may have a cross-sectional width of about 30 mm or less, about 25 mm or less, or even about 20 mm or less. The one or more openings may pass partially or completely through an insert, a base, a reinforcement structure, a rib structure, or any combination thereof. The one or more openings may be located about or adjacent a periphery, within an interior, or both of an end plate. The one or more openings may be located adjacent one or more rib structures, between two or more rib structures, within a cell, adjacent one or more inserts, or any combination thereof. The one or more openings may form a repetitive pattern, may be aligned with one or more other openings, may be staggered or offset from one or more other openings, or any combination thereof. The one or more openings may include one or more peripheral openings, one or more internal openings, one or more channel openings, the like, or any combination thereof.

One or more openings may include one or more peripheral openings. The one or more peripheral openings may function to receive and cooperate with one or more attachment mechanisms to secure at least a portion of a periphery of an end plate to at least a portion of a periphery of an electrode plate. Attachment about at least a portion of a periphery of the end plate to an adjacent electrode plate may apply a compressive force about a periphery of one or more electrode plates. The compressive force about the periphery during operation of the battery may resist outward bulging of one or more electrode plates. The compressive force about the periphery while drawing a vacuum within the battery may resist inward bending of one or more electrode plates, which may maintain one or more seals about one or more edges of the stack of electrode plates. The one or more peripheral openings may be located adjacent an outer reinforcement rib structure, within an interior of an end plate, within a cell, or any combination thereof. The one or more peripheral openings may be aligned or offset from one or more other openings. For example, one or more peripheral openings may be aligned with one or more other peripheral openings in a line substantially parallel to one or more rib structures. For example, one or more peripheral openings may be offset from an aligned plurality of internal openings and/or channel openings. One or more peripheral openings may have any cross-sectional width or diameter through which an attachment mechanism is able to pass through, to or from an adjacent electrode plate. One or more peripheral openings may be smaller than, equal to, or larger than one or more other openings. For example, one or more peripheral openings may be smaller than one or more channel openings.

One or more openings may include one or more internal openings. The one or more internal openings may function to receive and cooperate with one or more attachment mechanisms to secure at least a portion of an interior of an end plate to at least a portion of an interior of an electrode plate. An interior of an electrode plate may be defined as a portion of the electrode plate or substrate of an electrode plate located between raised edges or a frame of the electrode plate. Attachment about at least a portion of an interior of an end plate to an adjacent electrode plate may apply a compressive force about an interior of one or more electrode plates. The compressive force within the interior of an electrode plate during operation of the battery may resist outward bulging of one or more electrode plates. The compressive force within the interior of an electrode plate while drawing a vacuum within the battery may resist inward bulging of one or more electrode plates. The one or more internal openings may be located adjacent or distanced from one or more reinforcement rib structures, within an interior of an end plate, within a cell, or any combination thereof. The one or more internal openings may be aligned or offset from one or more other openings. For example, one or more internal openings may be aligned with one or more other internal openings in a line substantially parallel to one or more rib structures. For example, one or more internal openings may be offset from an aligned plurality of internal openings and/or channel openings. One or more internal openings may have any cross-sectional width or diameter through which an attachment mechanism is able to pass through, to or from an adjacent electrode plate. One or more internal openings may be smaller than, equal to, or larger than one or more other openings. For example, one or more internal openings may be smaller than one or more channel openings.

One or more openings may include one or more channel openings. The one or more channel openings may function to align with one or more openings of one or more electrode plates to form one or more channels; provide an opening for venting, filling, and/or venting the battery assembly; cooperate with one or more valves, receive one or more posts to compress the stack of electrode plates, or any combination thereof. The one or more channel openings may align (i.e., concentric alignment) with one or more openings and/or holes of one or more electrode plates and/or separators in a transverse direction to form one or more channels through the stack. The one or more channel openings may have a size substantially equal to one or more holes of one or more electrode plates and/or separators. The one or more channel openings may have any size through which one or more posts may pass through. One or more channel openings may have a smaller, equal, or larger cross-sectional width or area than one or more other channel openings. For example, one channel opening may have a larger diameter than one or more other channel openings to allow for filling, venting, and/or cooling of the battery. One or more channel openings may be connected to or in communicated with one or more valves. For example, a channel opening having a larger diameter than other channel openings may be connected to a valve. A surface of the base near and/or adjacent to one or more channel openings may be a sealing surface.

One or more end plates may include a sealing surface. The sealing surface may function to cooperate with one or more posts to compress and seal a stack of electrode plates. The sealing surface may be a surface of the end plates adjacent to one or more openings of an end plate, a surface of an end plate adjacent to a channel, a surface of the end plate between an insert and an opening, a surface of an insert, or any combination thereof. A sealing surface may be a surface of an end plate in direct contact with a portion of a post, such as an overlapping portion. A sealing surface may be opposing a surface of the end plate facing and/or in contact with a monopolar plate. The sealing surface of the plate may be modified to improve sealing when compression is applied by the posts. The sealing surface may be smoothed, contoured, roughened or surface treated. A smooth surface will have large contact area from which to make an electrolyte tight seal without defects that allow liquid flow. Contours such as concentric ring(s), ridge(s) or undulations cause areas or "rings" of high pressure contact to resist the flow of liquid electrolyte. The ridge may be filled with a gasket material such as a deformable flat sheet or O-ring to facilitate liquid sealing. Rough sealing surfaces of a deformable material can compress to form reliable liquid electrolyte seal. Surface treating the sealing surface to make it incompatible to wetting by the liquid electrolyte will prevent liquid electrolyte flow into the channel. If a hydrophilic electrolyte is used the sealing surface can be made hydrophobic. Likewise, if a hydrophobic electrolyte is used the sealing surface should be hydrophilic.

One or more end plates may include one or more inserts. The one or more inserts may function to interlock with one or more inserts of an electrode plate, to define a portion of one or more channels passing through the stack, forming a leak proof seal along one or more channels, cooperate with one or more valves, or any combination thereof. The one or more inserts may have any size and/or shape to interlock with one or more inserts of an electrode plate, form a portion of a channel, form a leak proof seal along one or more channels, cooperate with one or more valves, or any combination thereof. The one or more inserts may be formed or attached to a base of an end plate in any manner suitable for forming or attaching one or more rib structures. One or more inserts may project from a surface of an end plate forming one or more raised inserts. One or more inserts may project from a base of an end plate. One or more inserts may project is a same or opposing direction as one or more rib structures from the base. One or more inserts may have the same height and/or thickness as one or more rib structures. One or more inserts may project substantially orthogonally or oblique from a surface of the base. One or more inserts may be attached to or integral with a portion of the end plate. An insert which is integral with a portion of the end plate and projects from a surface of the end plate may be defined as a boss. The one or more inserts may have one or more openings therethrough. The one or more inserts may be concentric and formed about one or more openings. One or more inserts may extend a length of an opening. A sealing surface may be formed between the outer diameter of one or more openings and an interior of one or more inserts. For example, a surface of the base substantially perpendicular to a longitudinal axis of the battery located between an insert and an opening may be a sealing surface. One or more inserts may be capable of interlocking with one or more inserts of an adjacent electrode plate to form a leak proof seal about a channel. For example, one or more end plates may be machined or formed to contain matching indents, on a surface opposite from an insert, for bosses, inserts, sleeves, or bushings of an adjacent electrode plate.

One or more end plates may be comprised of one or more end plate materials. End plate materials may function to provide sufficient rigidity to the one or more end plates to resist deformation and provide reinforcement to one or more electrode plates while pulling a vacuum, filling, and/or operating the battery assembly. The one or more end plate materials may include any material or combination of materials capable of meeting any combination of the desired functions. The one or more end plate materials may have a stiffness of about 200 ksi (1,379 MPa) or greater, about 400 ksi (2,758 MPa) or greater, or even about 500 ksi (3,447 MPa) or greater. The one or more end plate materials may have a stiffness of about 1,500 ksi (10,342 MPa) or less, about 1,200 ksi (8,274 MPa) or less, or even about 1,000 ksi (6,895 MPa) or less. The one or more end plate materials may have a Compressive Strength of about 20 MPa or greater, about 40 MPa or greater, or even about 60 MPa or greater. The one or more end plate materials may have a Compressive Strength of about 1,300 MPa or less, about 1,200 MPa or less, or even about 1,000 MPa or less. The one or more end plate materials may have a Tensile Strength of about 300 MPa or greater, about 400 MPa or greater, or even about 500 MPa or greater. The one or more end plate materials may have a Tensile Strength of about 2,000 MPa or less, about 1,900 MPa or less, or even about 1,800 MPa or less. The one or more end plate materials may be part of a base, a reinforcement structure, one or more rib structures, one or more inserts, or any combination thereof. The one or more end plate materials may include any material suitable for an electrode plate, such as materials of a substrate. The one or more end plate materials may include a metal, a polymeric material, or both. Metal may include cast iron, steel, stainless steel, titanium, aluminum, carbon steel, the like, or any combination thereof. Polymeric material may be any material which may be molded. For example, the polymeric material may be injection molded. Polymeric material may include a thermoset polymer, a thermoplastic polymer, or a combination thereof. The polymeric material may be reinforced with any known reinforcement material known for use with polymers. Reinforcement material may include fibers, microspheres, beads, bubbles, the like or any combination thereof. Reinforcement material may include glass, polymers, ceramic or carbon, the like, or any combination thereof.

One or more end plates may include one or more attachment mechanisms. One or more attachment mechanisms may function to attach one or more end plates to one or more electrode plates, a stack of electrode plates, or both. The end plate being attached to one or more electrode plates or one or more end plates may prevent deformation of one or more electrode plates during vacuum drawing, filling, venting, cooling, charging, and/or discharging of one or more electrochemical cells before, during, and/or after operation of the battery. One or more end plates may be attached to one or more electrode plates, a stack of electrode plates, or both through any type of attachment mechanism able to withstand deformation forces before, after, or during operation of the battery. One or more attachment mechanisms may attach one or more end plates about at least a portion of a periphery of an end plate to an electrode plate, at least a portion of an interior of end plate to an electrode plate, or both. One or more attachment mechanisms may be any attachment mechanism capable of interlocking plastic to metal, plastic to plastic, metal to metal, or any combination thereof. The one or more attachment mechanisms may be integral with or separate from an end plate and/or an electrode plate. The one or more attachment mechanisms may attach to an exterior surface of an electrode plate, pass at least partially through one or more electrode plates, project from the end plate toward and/or into an electrode plate, project from an electrode plate toward and/or into an end plate, or any combination thereof. The one or more attachment mechanisms may be received in an opening of an end plate, an electrode plate, or both. One or more attachment mechanisms may include one or more adhesive materials, mechanical fasteners, molded fasteners, the like, or any combination thereof. A mechanical fastener may include a threaded fastener, a clip, a staple, the like, or any combination thereof. A threaded fastener may include a screw, a bolt, a stud, a nut, the like, or any combination thereof. An adhesive material may include an adhesive, a sealant, a tape, the like, or any combination thereof. Adhesive may include an epoxy, an acrylic, a urethane, the like, or any combination thereof. A tape may include very high bond tape, double sided tape, the like, or any combination thereof. A molded fastener may include a heat stake, a weld, the like, or any combination thereof. A clip may include a snap-fit, a press-fit, cantilever clip, clip with a hook face.

The base may have one or more recessed portions. The one or more recessed portions may function to receive one or more portions of one or more electrode plates, interlock with a periphery of one or more electrode plates, or both. The one or more recessed portions may have any size, shape, and/or configuration to receive one or more portions of one or more electrode plates, interlock with a periphery of one or more electrode plates, or both. The one or more recessed portions may have a shape substantially similar, reciprocal, and or negative to a portion of one or more electrode plates, such as a frame and/or raised edge. The one or more recessed portions may be located about an exterior and/or interior of the base. The one or more recessed portions may be located about a periphery of the base. The one or more recessed portions may be formed in a surface which comes into contact with one or more electrode plates. For example, one or more recessed portions may be formed about a peripheral edge of the base opposite a surface having an interior reinforcement structure. The one or more recessed portions may align and interlock with one or more raised edges or frames. The one or more recessed portions may be designed similarly to a frame or raised edge of an electrode plate or separator.

The one or more electrode plates may include one or more attachment mechanisms as described hereinbefore.

The battery assembly may include one or more valves. The one or more valves may function to draw a vacuum from an interior of the battery assembly, fill the battery assembly with an electrolyte, and/or vent the battery assembly during operation. The one or more valves may include a pressure release valve, check valve, fill valve, pop valve, and the like, or any combination thereof. The one or more valves may be connected to and/or in communication with one or more channels formed by one or more openings of an end plate, electrode plate, separator, or any combination thereof. The one or more valves may be in communication with a channel, such as a channel having a post therethrough or free of a post. The battery assembly may include a plurality of valves or a single valve used for pulling an internal vacuum, filling with electrolyte, venting the battery assembly, or any combination thereof. A reinforcement structure in opposing end plates may be particularly beneficial in cooperating with a single valve. The battery assembly may include one or more valves as described in US Patent Application Publication No. 2014/0349147, incorporated herein by reference in its entirety for all purposes. The assembly may contain pressure release valves for one or more of the cells to release pressure if the cell reaches a dangerous internal pressure. The pressure release valves are designed to prevent catastrophic failure in a manner which damages the system the battery is used with. Once a pressure release valve is released the battery is no longer functional. The assemblies disclosed may contain a single check valve which releases pressure from the entire assembly when or before a dangerous pressure is reached. Some exemplary suitable valves are disclosed in U.S. Pat. Nos. 8,357,469; 9,553,329; 9,685,677; 9,825,336; and US Patent Application Publication No.: 2018/0053926; incorporated herein by reference in their entirety for all purposes.

The battery assembly may include one or more buss bars. The one or more buss bars may function to transmit an electrical current from one or more electrochemical cells to an exterior of the battery assembly, from one or more current conduits and/or current conductors to one or more terminals, or any combination thereof. One or more buss bars may include a single or a plurality of buss bars. The one or more buss bars may include one or more positive buss bars, negative buss bars, or both. One or more positive buss bars may be in electrical communication with one or more positive terminals, positive current conductors, cathodes, or a combination thereof. One or more negative buss bars may be in electrical communication with one or more negative terminals, negative current conductors, anodes, or a combination thereof. The one or more buss bars may be comprised of one or more conductive materials as discussed hereinbefore. The one or more buss bars may be located on and/or affixed to a surface of the battery assembly, the membrane, a cover, a terminal cover, one or more electrode plates, one or more separators, anodes, cathodes, electrochemical cells or a combination thereof. The one or more buss bars may be affixed via one or more adhesives, bonding methods, mechanical fasteners, molding the like, or a combination thereof. The bonding methods may include soldering, welding, the like, or a combination thereof. The mechanical fasteners include one or more threaded fasteners (e.g., bolt, screw, nut, stud), an interference fit, one or more snap on tabs or pins, or a combination thereof. The buss bar may first be affixed to one or more electrochemical cells, anodes, cathodes, electrode plates, separators, covers, membranes, or a combination thereof and then placed into contact with the terminal cover. Placing into contact with a terminal cover may include over molding a membrane about the battery assembly, including one or more buss bars. Placing into contact with a terminal cover may include located a terminal cover about at least a periphery of some edges of the stack of electrode plates. The buss bar may first be affixed to the terminal cover and then placed into contact with one or more electrochemical cells, anodes, cathodes, electrode plates, separators, covers, membranes, or a combination thereof. The one or more buss bars may be molded into or onto one or more of the terminal covers, electrochemical cells, membrane, cover, anodes, cathodes, electrode plates, separators, or a combination thereof. Molding may include any exemplary molding method and/or technique disclosed herein or suitable for molding a conductive material into a nonconductive material. The one or more buss bars may have one or more portions which protrude from one or more terminal covers, membranes, exterior cases, electrode plates, end plates, or a combination thereof. A buss bar may have any suitable shape for transmitting current from one or more conduits, collectors, conductors, or a combination thereof to one or more terminals. A buss bar may have a shape which allows a buss bar to traverse across a surface of an electrode plate, a plurality of electrode plates, be in electrical communication (e.g., direct or indirect contact) with one or more end current conductors, or any combination thereof. A buss bar may be adjacent to one or more electrode plates, end plates, terminal covers, or a combination thereof. A buss bar may be substantially parallel with one or more peripheral edges, substrate surfaces, or both of one or more electrode plates. A buss bar has surfaces opposing one another. The opposing surfaces may include a lower surface opposing an upper surface. The lower surface may face toward the stack of electrode plates. The upper surface may face away from the stack of electrode plates, toward a membrane, toward a terminal cover, or any combination thereof. One or more surfaces of a buss bar may be smooth, textured, tapered, ridged, grooved, or a combination thereof. One or more ridges, grooves, or other shapes in the buss bar may be formed at uniform intervals or at random distances from each other. One or more shapes formed in the buss bar may aid in adhesion with a bonding material. A buss bar may have a bonding material applied and adhered thereon. The bonding material may be located the lower surface and the stack of electrode plates, the upper surface and membrane, the upper surface and a terminal cover, or any combination thereof. A buss bar may be in the shape of a substantially linear strip, non-linear, may include one or more bends, or a combination thereof. A buss bar may be substantially rectangular, square, L-shaped, J-shaped, C-shaped, the like, or a combination thereof. A buss bar may be substantially L-shaped having a first leg substantially perpendicular to a second leg. A first leg may have a length shorter, equal to, or longer than a length of a second leg. Both the first leg and the second leg may be substantially perpendicular to each other while being substantially parallel with a plurality of peripheral edges of one or more electrode plates. A second leg of the buss bar may traverse across a plurality of electrode plates, be substantially parallel with one or more transverse channels of the battery assembly, or both. Both the first leg and the second leg may be substantially parallel, perpendicular, or any angle therebetween relative to a surface of one or more electrode plates (e.g., substrate surface). A buss bar may include one or more openings formed within one or more terminal retainers. The one or more terminal retainers may be integral with or part of the first leg, second leg, or both.

A buss bar may include one or more terminal retainers. The one or more terminal retainers may function to retain and support one or more terminals. The one or more terminal retainers may have any shape and/or size suitable for retaining one or more terminals. The one or more terminal retainers may be integral with or affixed to one or more buss bars. The one or more terminal retainers may be affixed to one or more buss bars with one or more adhesives, may be welded thereto, or both. One or more terminal retainers may extend away from a surface of one or more buss bars. One or more buss bars may extend away from an upper surface of a buss bar, away from a stack of electrode plates, toward a terminal cover, toward a membrane, through a terminal cover, through a membrane, or any combination thereof. One or more terminal retainers may be located along any portion of a buss bar suitable for receiving a terminal. One or more terminal retainers may project from a first leg, second leg, or both of a buss bar. One or more terminal retainers may have any suitable shape for retaining one or more terminals. One or more terminal retainers may be substantially cylindrical, spherical, conical, cuboidal, cubical, prismed, the like, or a combination thereof. The one or more terminal retainers may be at least partially hollow to receive one or more terminals therethrough. The one or more terminal retainers may include a hollow opening throughout an entire length. A hollow opening of the retainer may be part of or aligned with one or more terminal openings of a buss bar. The hollow opening of the retainer may include one or more engagement features adapted to mate with one or more terminals. The hollow opening may include a threaded surface. One or more terminals may be received within the one or more hollow openings. The one or more terminal retainers may be comprised of the same or a different material as the buss bar. The one or more terminal retainers may be comprised of one or more conductive materials. The one or more conductive materials may be those disclosed hereinbefore. The one or more conductive materials of a terminal retainer may aid in transferring current from the buss bar to the terminal and vice-versa. The one or more terminal retainers may include or be free of one or more seals. The one or more seals may function to prevent leakage of electrolyte, gasses, or both from within an interior of the battery assembly to an exterior such as during evacuation, filling, and/or operation of the battery assembly. The one or more seals may function to aid in retaining one or more terminals within the terminal retainer, providing additional reinforcement to a terminal, or both. The one or more seals may be located about at least a portion of or an entire periphery of a terminal retainer, within a portion of or along an entire length of hollow opening of a terminal retainer, or any combination thereof. The one or more seals may be comprised of any material suitable for sealing between a terminal and a terminal retainer, a terminal retainer and a terminal opening, or both. The one or more seals may be any suitable gasket. For example, the one or more seals may be a deformable flat sheet or O-ring to facilitate liquid sealing. The one or more seals may also be formed by melt bonding the terminal retainer to the terminal cover, membrane, end plate, or a combination thereof.

A buss bar may include one or more terminal openings. The one or more terminal openings function to receive, support and/or retain one or more terminals, current conductors, or both; transmit a current from the one or more electrochemical cells, current conduits, current conductors, or a combination thereof to one or more terminals; or any combination thereof. The terminal opening is formed within the buss bar and may pass partially or completely through a thickness of the buss bar. A terminal opening may be smooth or include one or more engagement features. For example, a surface of a terminal opening may be threaded. A threaded surface may allow for engaging with one or more threads of one or more terminals. A terminal opening may be located in one or more legs of a buss bar. A terminal opening may be formed in a shorter leg of a buss bar. A terminal opening may be formed in a portion of a buss bar in close proximity to one or more current conductors. The terminal opening may receive a terminal (e.g., a post), a current conductor, or both. The terminal opening of a buss bar may be aligned (e.g., concentric) with a terminal opening of a terminal cover. By being aligned, a terminal is able to be retained by the buss bar and pass through the terminal opening of the terminal cover to be exposed.

The one or more buss bars may be in communication with, affixed to, or in contact with one or more bias devices. The one or more bias devices may function to apply a biasing force of the one or more buss bars toward one or more of the electrochemical cells, anodes, cathodes, electrode plates, separators, or a combination thereof. The one or more bias devices may include one or more springs, elastomeric materials, the like, or a combination thereof. The one or more bias devices may be located and/or attached to the terminal cover or any other portion of the battery assembly. For example, one or more bias devices may be affixed to an interior surface of a terminal cover and apply a biasing force toward one or more buss bars toward the one or more electrode plates. The one or more biasing devices may be affixed to a terminal cover in a pattern or shape substantially similar to that of the one or more buss bars, at reciprocal portions which align with one or more ends of one or more buss bars, or both.

The battery assembly may include one or more terminals. The one or more terminals may function to transmit the electrons generated in the electrochemical cells to a system that utilizes the generated electrons in the form of electricity. For example, the terminals may function by being connected to a load which utilizes the electricity stored in the battery. The one or more terminals may pass through one or more terminal covers, one or more end plates, one or more electrode plates, a membrane, a case, or any combination thereof. The one or more terminals may pass through an electrode plate from an end plate to the outside or passing through the side of the case or membrane about the assembly essentially parallel to the plane of the end plates. The one or more terminals may not be in direct contact with one or more electrode plates while in contact with one or more current conductors. The terminal matches the polarity of the anode, cathode, current conductor, or a combination thereof of a monopolar plate. The cathode of the monopolar plate and the cathodes of one or more of the bipolar plates with a cathode current collector may be connected to independent positive terminals. The anode of the monopolar plate and the anodes of one or more of the bipolar plates with an anode current collector may be connected to independent negative terminals. The cathode current collectors may be connected and the anode current collectors may be connected in parallel. The individual terminals may be covered in a membrane leaving only a single connected positive and a single connected negative terminal exposed. One or more terminals may be comprised of one or more conductive materials described herein.

The terminals may include one or more posts (e.g., terminal posts). The one or more posts may function to receive an electrical current (e.g. flow of electrons) from one or more electrochemical cells, current conduits, buss bars, or a combination thereof and transmit the electrons in the form of electricity to an exterior of the battery assembly. The one or more posts may be able to resist external mechanical forces. The one or more posts may include one or more SAE posts, JIS posts, L-terminals, or any combination thereof. The one or more posts may be secured to one or more buss bars, terminal cover, cover, membrane, current conduit, current conductor, current collector, or any combination thereof. By being secured, the one or more posts may be able to resist or be supported against external mechanical forces. The one or more posts may be threaded, unthreaded, or a combination of both. One or more threads may engage with one or more threads of one or more terminal openings. The one or more posts may pass through one or more terminal openings of a terminal cover, membrane, cover, buss bar, or combination thereof. The one or more posts may be encircled and/or partially enclosed by one or more terminal openings, raised edges, reinforcement structures, or a combination thereof. The one or more posts may be comprised of one or more conductive materials as discussed herein.

The battery assembly may include a membrane. The membrane may function to seal about the edges of one or more end plates, plurality of electrode plates, one or more separators, one or more channels, or any combination thereof. The membrane may be bonded to the edges of the one or more end plates, plurality of electrode plates, and/or one or more separators by any means that seals the edges of the end plates, electrode plates, and separators and isolates the one or more electrochemical cells. Exemplary bonding methods comprise adhesive bonding, melt bonding, vibration welding, RF welding, and microwave welding among others. The membrane may be a sheet of a polymeric material which material can seal the edges of the end plates, monopolar plates, and bipolar plates and can withstand exposure to the electrolyte and the conditions the battery is exposed to internally and externally. The same materials useful for the substrate of the electrode plates may be utilized for the membrane. The membrane may be a thermoplastic polymer that can be melt bonded, vibration welded or molded about the substrates of the monopolar and bipolar plates. The same thermoplastic polymer may be utilized for the monopolar and bipolar substrates and the membranes. Exemplary materials are polyethylene, polypropylene, ABS and, polyester, with ABS most preferred. The membranes may be the size of the side of the stacks to which they are bonded and the membranes are bonded to each side of the stack. The edges of the adjacent membranes may be sealed. The edges can be sealed using adhesives, melt bonding or a molding process. The membranes may comprise a single unitary sheet which is wrapped about the entire periphery of the stack. The leading edge of the membrane, first edge contacted with the stack, and the trailing edge of the stack, end of the membrane sheet applied, are may be bonded to one another to complete the seal. This may be performed by use of an adhesive, by melt bonding or a molding process. In melt bonding the surface of the membrane and/or the edge of the stack are exposed to conditions at which the surface of one or both becomes molten and then the membrane and the edge of the stack are contacted while the surfaces are molten. The membrane and edge of the stack bond as the surface freezes forming a bond capable of sealing the components together. The membrane may be taken from a continuous sheet of the membrane material and cut to the desired length. The width of the membrane may match the height of the stacks of monopolar and bipolar plates. The membrane has sufficient thickness to seal the edges of the stack of monopolar and bipolar sheets to isolate the cells. The membrane may also function as a protective case (e.g., case, exterior case) surrounding the edges of the stack. The membrane may have a thickness of about 1 mm or greater, about 1.6 mm or greater or about 2 mm or greater. The membrane may have a thickness of about 5 mm or less, 4 mm or less or about 2.5 mm or less. When the membrane is bonded to the edge of the stack, any adhesive which can withstand exposure to the electrolyte and the conditions of operation of the cell may be used. Exemplary adhesives are plastic cements, epoxies, cyanoacrylate glues or acrylate resins. Alternatively, the membrane may be formed by molding a thermoplastic or thermoset material about a portion of, or all of, the stack of electrode plates. Any known molding method may be used including thermoforming, reaction injection molding, injection molding, roto molding, blow molding, compression molding and the like. The membrane may be formed by injection molding the membrane about a portion of or all of the stack of electrode plates. Where the membrane is formed about a portion of the stack of the plates it may be formed about the edges of the electrode plates or electrode plates and the separator.

The sealed stack may be placed in a case (e.g., exterior case) to protect the formed battery. Alternatively, the membrane in conjunction with a protective covering over the monopolar plates at the end of the stack may be used as a case (e.g., exterior case) for the battery. The monopolar plates may have an appropriate protective cover attached or bonded to the surface opposite the anode or cathode. The cover may be the same material as the membrane or a material that can be adhesively bonded or melt bonded to the membrane and can have a thickness within the range recited for the membranes. If affixed to the end of the plates the cover can be affixed with any mechanical attachment including the posts having overlapping portions. The case may be formed by molding a membrane about the stacks of electrode plates and/or the opposite sides of the monopolar plates.

The battery assembly of the disclosure includes or may be free of one or more terminal covers. The one or more terminals covers may function as a cover. The one or more terminal covers may be separate from or be the membrane, exterior casing, end plate, or any combination thereof. Any of the features of the terminal cover, may be part of an end plate, membrane, exterior casing, or combination thereof. For example, the one or more terminal covers may be a portion of the membrane that covers one side of the stack of battery plates. As another example, a terminal cover may be located adjacent to a portion of a membrane which covers one side of the stack of battery plates. And even further, the terminal cover may be integrated with an end plate such that the end plate. The one or more terminal covers may function as a lid to allow for handling and/or sealing of the battery assembly. The one or more terminal covers may resist external mechanical forces, such as vibrational, impact, and/or pulling forces. The one or more terminal covers may provide reinforcement to the plurality of electrode plates, current conductors, or a combination thereof. The one or more terminal covers may provide structural support and/or a protective enclosure for one or more terminals. The one or more terminal covers may be located adjacent to one or more electrochemical cells, a casing, membrane, or a combination thereof. The one or more terminal covers may be located adjacent and perpendicular to one or more end plates, monopolar plates, bipolar plates, separators, or a combination thereof. The one or more terminal covers may function as a cover for the battery assembly. The one or more terminal covers may have a width and/or length suitable to seal an exterior surface of the battery assembly. For example, a width may be about equal to or larger than a width of the stack of electrode plates. A width may be considered generally perpendicular to an axis of one or more transverse channels passing through the assembly. A width may be about equal to or larger than a length of the stack of electrode plates. A length may be equal to the linear distance of stack of electrode plates parallel with the axis of one or more transverse channels passing through the assembly. The one or more terminal covers may be permanently or removably affixed to the battery assembly. The one or more terminal covers may be over molded about the battery assembly. For example, a terminal cover may be a portion of a membrane or exterior casing which is applied over the peripheral edges and protruding current conductors. As another example, the terminal cover may be a separate component from the membrane, the exterior casing, or both. The one or more terminal covers may be affixed by one or more adhesive materials, mechanical fasteners, bonding methods, a friction fit, or a combination thereof. Adhesive materials may include one or more suitable glues. One or more mechanical fasteners may include one or more threaded fasteners (screws, bolts, studs, nuts, the like, or a combination); rivets, ratchet grips, snap on connections, straps, or a combination thereof. One or more bonding methods may include melt bonding, heat staking, solvent welding, RF welding, the like, or a combination thereof. The one or more terminal covers may include a seal about a perimeter. The seal may be a rubber gasket. A seal may also be located about or within one or more openings and/or vents of the terminal cover. The one or more terminal covers may include one or more reinforcement structures, openings, vents handling features, raised surfaces, seals, bias devices, buss bars, current conduits, or any combination thereof.

The one or more terminal covers may include one or more reinforcement structures. The one or more reinforcement structures may function to physically support and strength the terminal cover. The one or more reinforcement structures may provide structural stability against external mechanical forces, such as vibration, pulling, and impact forces. The one or more reinforcement structures may be similar to the internal reinforcement of the one or more end plates. The reinforcement structure may have any size, shape, and/or configuration to provide any combination of the desired features. The reinforcement structure may absorb and or distribute external mechanical forces to prevent damage to an inside of the battery assembly, such as the electrode plates, separators, and/or electrochemical cells. The reinforcement structure may absorb, distribute, or deflect the external mechanical forces across a surface of the terminal cover. The distribution may be relatively uniform across the cover. By distributing, absorbing, or deflecting the external mechanical forces, the cover may resist damage to one or more portions of the electrochemical cells. The reinforcement structure may be distributed across a surface of the terminal cover, be localized in regions of a surface of the cover, or both. The reinforcement structure may include one or more reinforcement structures, such as a single reinforcement structure or a plurality of reinforcement structures. Exemplary reinforcement structures may include one or more rib structures, one or more cells, one or more inserts, one or more openings, one or more gussets, one or more gaskets, one or more bosses, one or more partial bosses, one or more attachment mechanisms, the like, or any combination thereof. The reinforcement structure may include one or more strengthening materials to provide reinforcement to an end plate. Exemplary strengthening materials may include additives, such as fibers, composite materials, the like, or both. Rib structures of a reinforcement structure may be similar to rib structures of an internal reinforcement structure.

The one or more reinforcing structures may include one or more bores. The one or more bores may function to receive one or more mounting components to secure the terminal cover to the battery assembly. The one or more bores may be blind bores, partial bores, full bores, or a combination thereof. The one or more bores may be part of the reinforcement structure or deformation relief features, such as those described in U.S. Pat. No. 6,303,247 incorporated herein by reference in its entirety for all purposes.

The one or more terminal covers may include one or more raised surfaces. The one or more raised surfaces may be located about a periphery of a terminal cover. The one or more raised surfaces pay provide an effective seal of the terminal cover with the stack of electrode plates and/or membrane. The one or more raised surfaces may allow an interior portion of the terminal cover to have a lesser thickness than the outer periphery. The raised surfaces may partially surround the battery assembly when the terminal cover is assembled with the battery assembly. The raised surface may include one or more seals and/or have one or more seals attached thereto.

The one or more terminal covers may include one or more openings. The one or more openings may include one or more terminal openings. The one or more openings may have features similar to openings of one or more electrode plates, separators, or both as discussed hereinbefore. The one or more openings may function to allow one or more terminals to be exposed and accessible from an exterior of the battery assembly. The one or more openings may have one or more terminals, terminal retainers, a portion of a buss bar, or any combination thereof located therein. For example, the one or more terminal openings may include both a terminal retainer and terminal therethrough. The one or more terminal openings may be concentric with one or more terminal openings, terminal retainers, terminals, or any combination thereof. The one or more openings may have one or more bosses, inserts, raised surfaces, or a combination thereof located therein or adjacent thereto. The one or more bosses, inserts, raised surfaces, or a combination thereof may surround one or more openings, surround one or more terminals, project from a surface of the terminal plate, or a combination thereof. The one or more bosses, inserts, and/or bosses may provide a protective enclosure for one or more terminals. The one or more bosses, inserts, and/or bosses may be reinforced by one or more reinforcement structures. The one or more reinforcement structures may be similar to reinforcement structures discussed herein. The one or more reinforcement structures may include a plurality of ribs, strakes, gussets, backing plates, the like, or a combination thereof. The one or more reinforcement structures may include one or more internal material reinforcements. The one or more internal material reinforcements may include one or more reinforcing materials as discussed hereinbefore, such as fillers known in the art. The one or more terminal openings may include or be free of one or more seals therein. The one or more seals may function to prevent leakage of electrolyte, gasses, or both from within an interior of the battery assembly to an exterior. The one or more seals may function to aid in retaining one or more terminals within the terminal opening, one or more terminal retainers within the terminal opening, providing additional reinforcement to a terminal, or any combination thereof. The one or more seals may be located about at least a portion of or an entire periphery of a terminal retainer, within a portion of or along an entire length a terminal opening, or any combination thereof. The one or more seals may be comprised of any material suitable for sealing between a terminal and a terminal opening, a terminal retainer and a terminal opening, or both. The one or more seals may be any suitable gasket. For example, the one or more seals may be a deformable flat sheet or O-ring to facilitate liquid sealing. The one or more seals may also be formed by melt bonding the terminal retainer, terminal, or both to the surface of the terminal cover along the surface of the opening of the terminal cover.

The one or more terminal covers may include one or more handling features. The one or more handling features may function to allow the battery assembly to be easily handled by an individual, individuals, a machine (such as a material handling robot), or a combination thereof. The one or more handling features may be integrally formed into the terminal cover, affixed to the terminal cover, or both. The one or more handling features may include one or more straps, handles, hand openings, indentations, the like, or a combination thereof.

The battery assembly may be able to withstand internal pressures while or after drawing an internal vacuum without deforming, warping, leaking, or cracking due to reinforcement from one or more end plates. Internal pressures while or after drawing an internal vacuum, before filling with an electrolyte, and/or before operating the battery assembly may include an evacuation of about 5 psi or greater, about 10 psi or greater, or even about be 15 psi or greater. Internal pressures while or after drawing an internal vacuum, before filling with an electrolyte, and/or before operating the battery assembly may include an evacuation of about 30 psi or less, about 25 psi or less, or even about be 20 psi or less. The battery assembly may be able to withstand internal pressures during operation of about of 10 psi or greater without leaking or warping due to the internal pressures, about 20 psi or greater, about 50 psi or greater and about 100 psi or less. The assemblies may be able to withstand internal pressures of about 6 to about 10 psi during operation. The assemblies may provide an energy density of about 34-watt hours per kilogram, about 40-watt hours per kilogram or about 50-watt hours per kilogram. The assemblies of the invention can generate any voltage desired, such as 6, 12, 24, 48 or 96 volts. The voltage can be higher although about 200 volts is a practical upper limit.

The battery assembly of the disclosure may include any of the features described in US Publication Nos. 2014/0349147, 2015/0140376, 2016/0197373, 2017/0077545, incorporated herein by reference in their entirety. Illustrative Embodiments The following descriptions of the Figures are provided to illustrate the teachings herein, but are not intended to limit the scope thereof. Features of any one Figure may be employed in another.

FIG. 1 illustrates an end plate 10. The end plate 10 includes an internal reinforcement structure 12. The internal reinforcement structure 12 includes a plurality of ribs 14 projecting from a base 15. The plurality of ribs 14 include an outer reinforcement rib 16 about the periphery of the end plate 10. The plurality of ribs 14 include a plurality of latitudinal ribs 18 and longitudinal ribs 20. The latitudinal ribs 18 are substantially perpendicular to the longitudinal ribs 20. The plurality of ribs 14 form a plurality of cells 22 which expose the base 15 between the ribs 14. The end plate 10 includes a plurality of openings 24. The plurality of openings 24 includes a plurality of peripheral openings 26. Each peripheral opening 26 is at least partially surrounded by a raised boss 27 projecting from the base 15 of the end plate 10. The peripheral openings 26 are between the outer reinforcement rib 16 and a latitudinal and/or longitudinal rib 18, 20. The plurality of openings 24 further includes a plurality of internal openings 28. The internal openings 28 are disposed in the cells 22 formed between the plurality of ribs 14. The internal openings 28 extend through the base 15. The plurality of openings 24 includes a plurality of channel openings 30. Each channel opening 30 is partially surrounded by an insert 32 which projects from the base 15 of the end plate 10.

Figure 2:
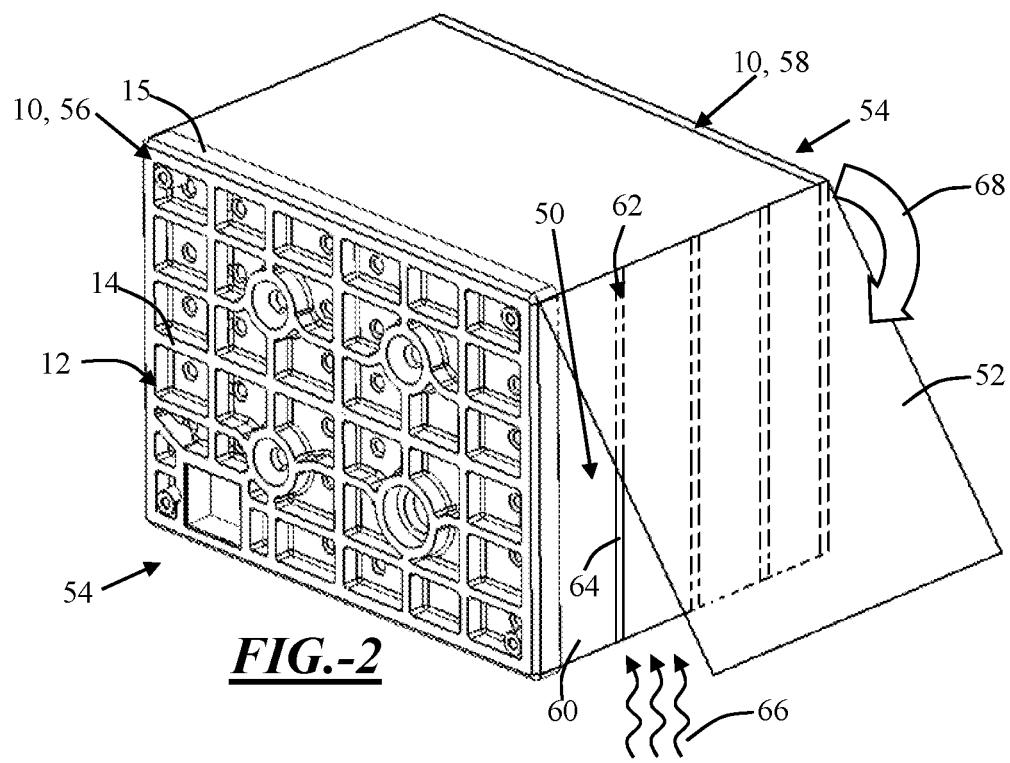
FIG. 2 is a perspective view of a battery assembly having the end plate of FIG. 1.

FIG. 2 shows applying a membrane 52 about an edge of a stack of electrode plates 50. Located at opposing ends 54 of the stack of electrode plates 50 are two of the end plates 10. The two end plates 10 include a first end plate 56 located at an opposing end 54 of the stack of electrode plates 50 as a second end plate 58. Each end plate 10 includes a base 15 from which a plurality of ribs 14 project to form an internal reinforcement structure 12. Disposed about the electrode plates 50 are frames 60. Sandwiched between the individual electrode plates 50 are separators 62. Disposed about each separator 62 are frames 64 for the separators. The frames 64 for the separators are between the frames 60 for the electrode plates 50. The membrane 52 is applied to the frames 60, 64 using a source of heat 66 and pressure 68 to seal the membrane 52 to the edge of the stack of electrode plates 50 and frames 60, 64.

Figure 3:
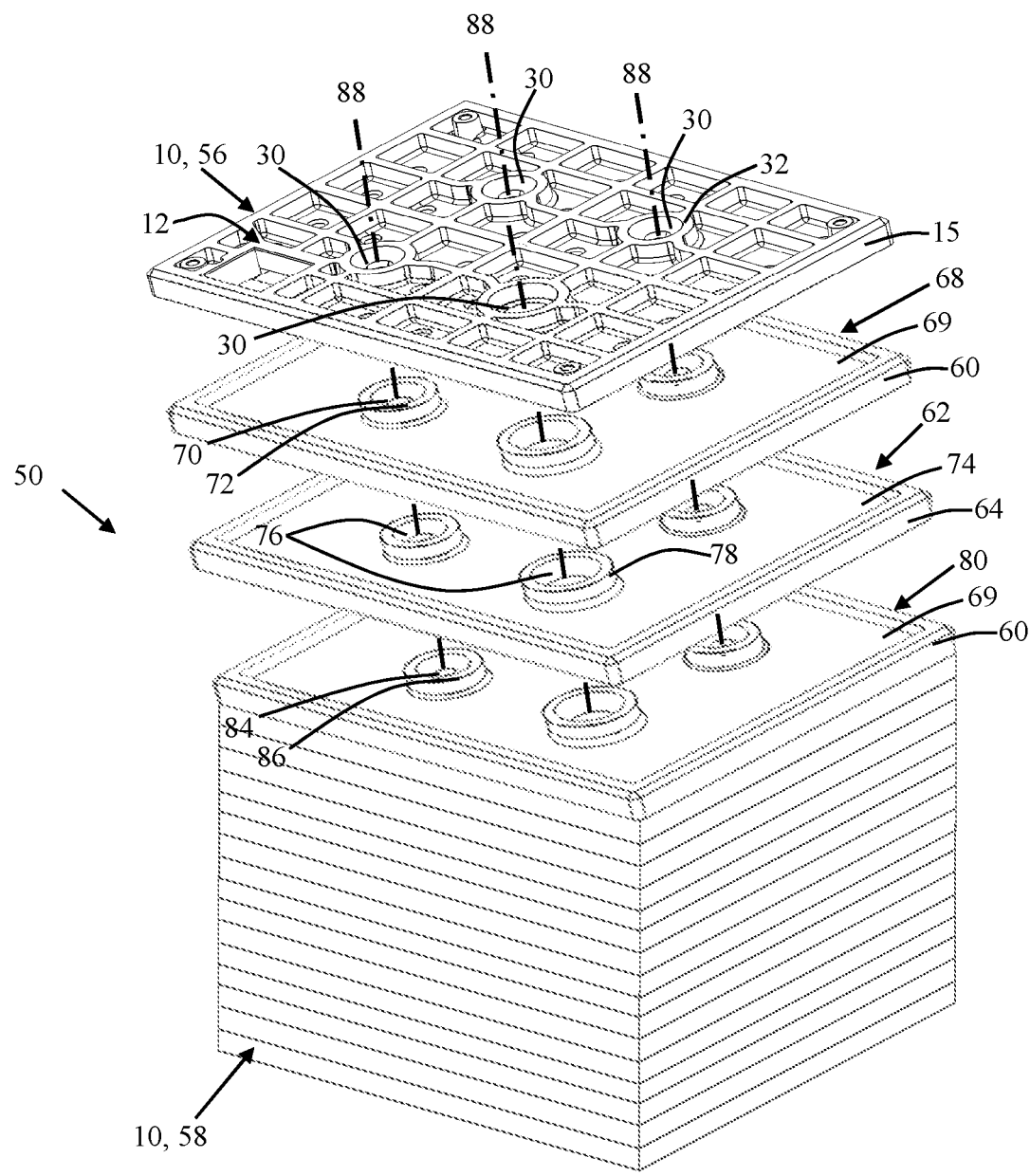
FIG. 3 illustrates a partially exploded stack of electrode plates.

FIG. 3 shows a partially exploded stack of electrode plates 50. Shown is an end plate 10 which is a first end plate 56. The first end plate 56 includes an internal reinforcement structure 12. The end plate 10 includes a plurality of channel openings 30. Each channel opening 30 is partially surrounded by a raised insert 32 projecting from the base 15 of the end plate 10. Adjacent to the first end plate 10, 56 is a monopolar plate 68. The monopolar plate 68 includes a substrate 69 and a frame 60. The frame 60 forms a raised edge about the periphery of the substrate 69. The monopolar plate 68 includes a plurality of channel openings 70 in the substrate 69. Each channel opening 70 is partially surrounded by a raised insert 72 projecting from the substrate 69 of the monopolar plate 68. Adjacent to the monopolar plate 68 is a separator 62. The separator 62 includes a frame 64. The frame 64 forms a raised edge about the periphery of the separator 62. The separator 62 further includes a glass mat 74 located in the interior and adjacent to the frame 64. The separator further includes a plurality of channel openings 76. Each channel opening 76 is partially surrounded by a raised insert 78 projecting from the separator 64. Adjacent to the separator 64 is a bipolar plate 80. The bipolar plate 80 includes a substrate 69 and a frame 60. The frame 60 forms a raised edge about the periphery of the substrate 60 of the bipolar plate 80. The bipolar plate 80 includes a plurality of channel openings 84. Each channel opening 84 is partially surrounded by a raised insert 86 projecting from the substrate 60 of the bipolar plate 80. The raised inserts 72, 78, 86 and channel openings 70, 76, 84 align and interlock to form one or more transverse channels 88 through the stack of electrode plates 50 and opposing end plates 56, 58. One or more of the transverse channels 88 can receive one or more posts 96 (not shown) as disclosed in US 2014/0349147, such that one or more posts 96 (not shown) extend through one or more of the transverse channels 88.

FIG. 4 illustrates a cutaway of an end plate 10 along plane A-A as shown in FIG. 1, through two peripheral openings 26. The end plate 10 is affixed to an electrode plate 50, which is a monopolar plate 68, such as when the end plate 10 is assembled at an end of a stack of electrode plates 50 (not shown). The end plate 10 includes a recessed edge 13 about the periphery of the base 15. The recessed edge 13 is on the opposite surface of the base 15 as the plurality of ribs 14. The recessed edge 13 receives the frame 60 of the monopolar plate 68. The monopolar plate 68 includes a substrate 69 and an anode 92. The anode 92 is deposited on the substrate 60 on a surface opposite a surface facing the end plate 10. The end plate 10 includes a plurality of peripheral openings 26. Each of the peripheral openings 26 is located adjacent to the outer reinforcement rib 16 and partially surrounded by a raised boss 27. Extending through each peripheral opening 26 is a threaded fastener 34. The threaded fastener 34 is received within a nut 36 embedded in the substrate 69 of the monopolar plate 68. The threaded fasteners 34 cooperate with the nuts 36 to secure the end plate 10 to the monopolar plate 68 about a periphery of the end plate 10.

FIG. 5 illustrates a cutaway of the end plate 10 along plane B-B in FIG. 1, through a plurality of internal openings 28. The end plate 10 is affixed to a monopolar plate 68, such as when assembled to a stack of electrode plates 50 (not shown). The monopolar plate 68 includes a substrate 69 and an anode 92. The anode 92 is deposited on the substrate 60 on a surface opposite a surface facing the end plate 10. The end plate 10 includes a plurality of internal openings 28.

Each of the internal openings 28 is located between individual ribs 14 in cells 22. The internal openings 28 extend through the base 15. A plurality of heat stakes 38 project from the substrate 69 of the monopolar plate 68 and through the internal openings 28. The heat stakes 38 are formed as bosses 39 protruding from the monopolar plate 68. The bosses 39 are received within the internal openings 28. The bosses 39 are deformed with heat to form a head 40 on the heat stakes 38. The heat stakes 38 interlock the monopolar plate 68 with the end plate 10.

Figure 6:
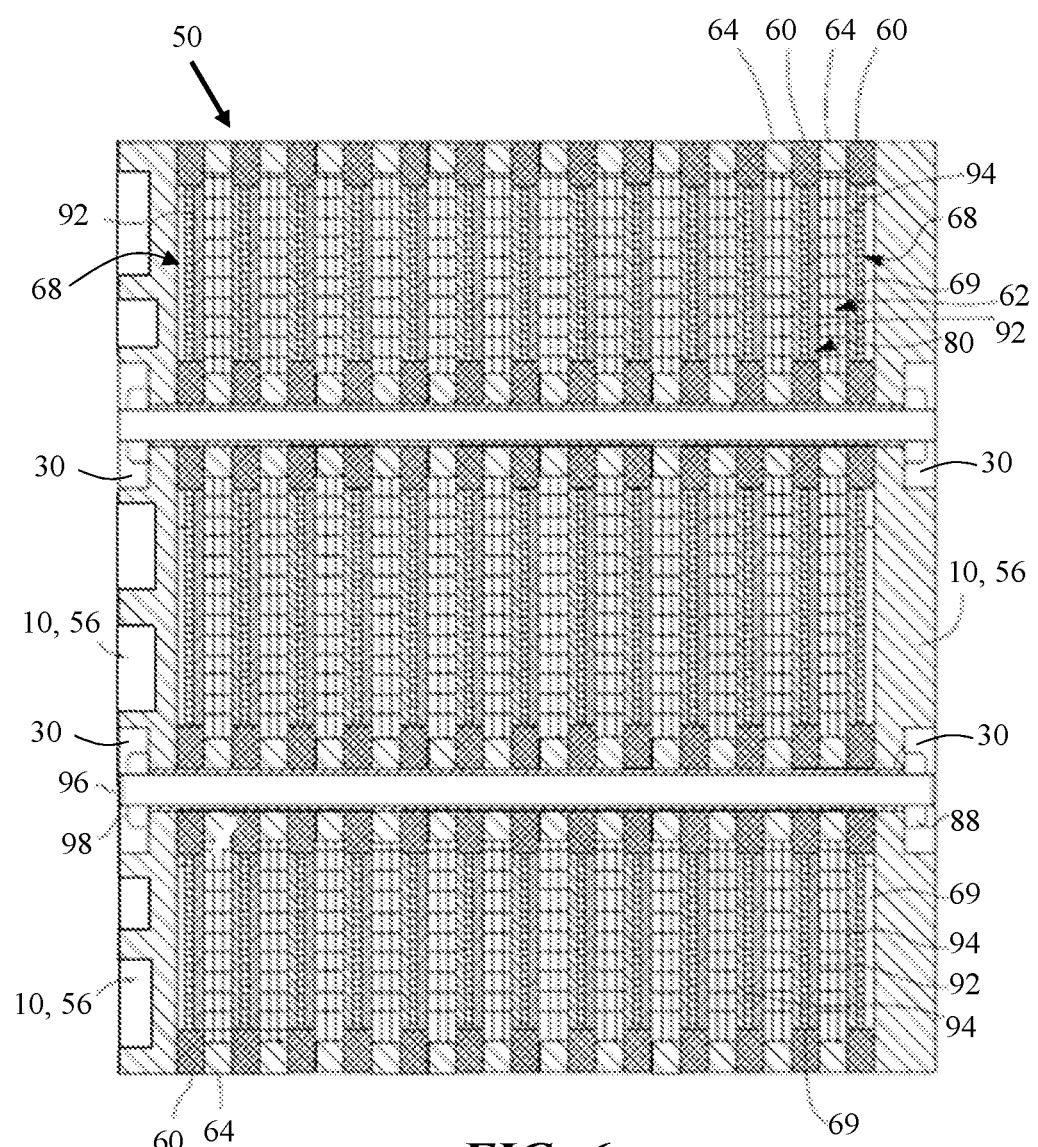
FIG. 6 is a cross-section view along section C-C as shown in FIG. 1.

FIG. 6 shows a cutaway along the plane shown by line C-C through the transverse channels 88 formed by the channel openings 30. Shown is a monopolar plate 68 having a substrate 69 and a cathode 94 having a frame 60 the ends of the substrate 69. Adjacent to the cathode 94 on the monopolar plate 68 is a separator 62 having a frame 64 on each end. Adjacent to separator 62 is a bipolar plate 80. The bipolar plate 80 includes an anode 92 disposed on the substrate 69 adjacent to the separator 62. The substrate 69 includes a cathode 94 disposed on the opposite surface as the anode 92. The bipolar plate 80 includes a frame 60 on each end. In this view, there are number of bipolar plates 80 arranged as described. Between the bipolar plates 80 are separators 62. At the opposite end of the stack is a monopolar plate 68 having a substrate 69, with a frame 60 shown at the ends in this view and an anode 92 facing the adjacent separator 62. The stack of electrode plates 50 forms electrochemical cells with the separators 62 located in the cells. Also shown are the transverse channels 88. Posts 96 are disposed within the transverse channels 88. The posts 96 include an overlapping portion 98 formed at each end which seals the transverse channel 88.

Figures 7, 8:
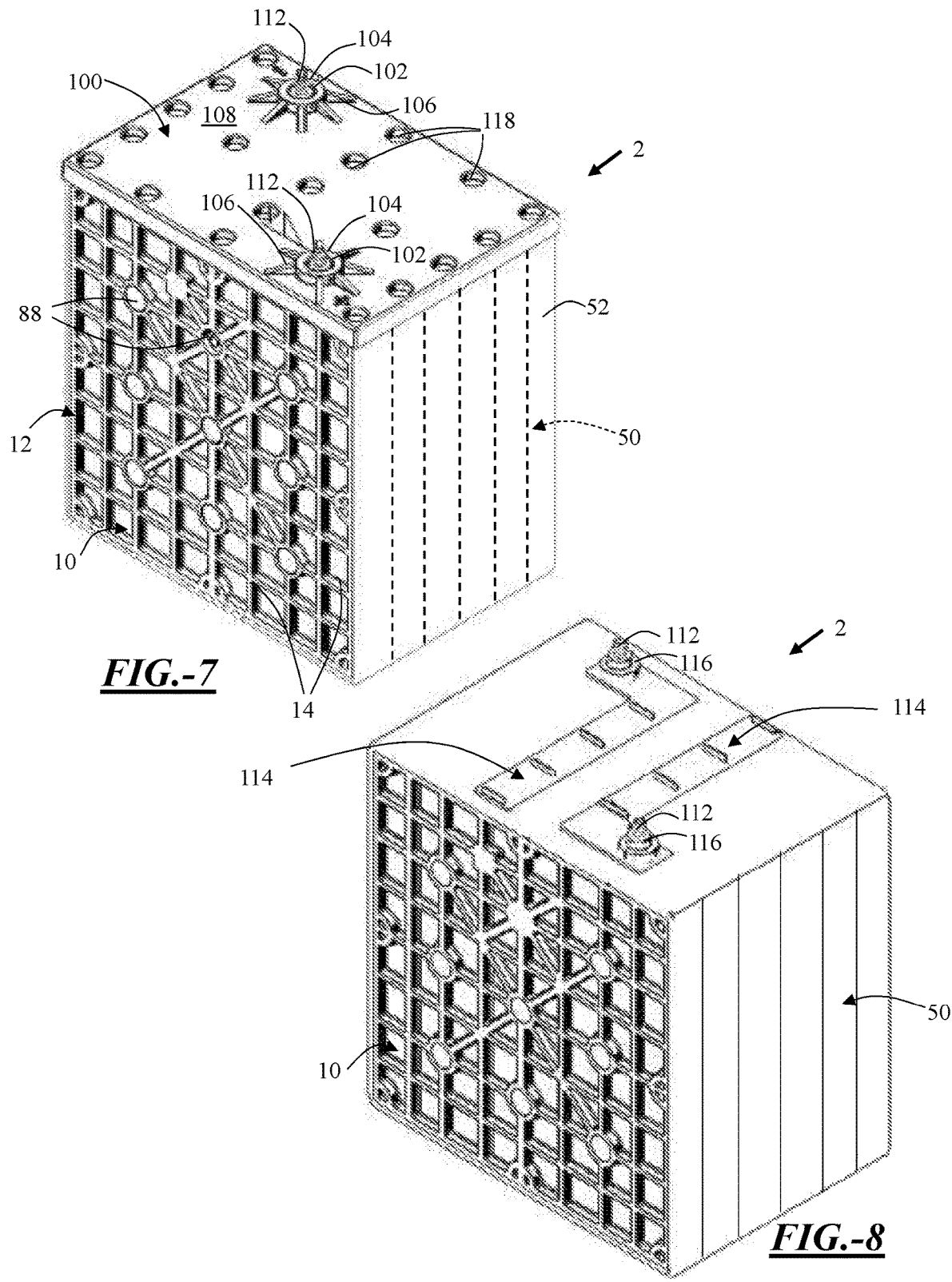
FIG. 7 illustrates a battery assembly having a terminal cover.
FIG. 8 illustrates a battery assembly having a plurality of buss bars.

FIG. 7 illustrates a battery assembly 2. The battery assembly 2 includes an end plate 10 located at an end of a stack of electrode plates 50. Surrounding the stack of electrode plates 50 is a membrane 52. Adjacent to the end plate 10 and stack of electrode plates 50 is a terminal cover 100. The terminal cover 100 is generally perpendicular to both the end plate 10 and the stack of electrode plates 50. The terminal cover 100 includes a plurality of terminal openings 102. The plurality of terminal openings 102 may be generally parallel to a direction of one or more transverse channels 88 extending through the battery assembly 2. At least some of the plurality of openings 102 are encircled by a raised edge 104. The raised edge 104 is reinforced by a plurality of gussets 106. The plurality of gussets 106 are located about the raised edge 104. The plurality of gussets 106 connect and/or extend from an outwardly facing surface 108 of the terminal cover to the raised edge 104. The terminal cover 100 includes a plurality of bores 118. Extending through each individual opening 100 is a terminal 112.

FIG. 8 illustrates a battery assembly 2 with a terminal cover 100 removed. Secured onto a surface of the battery assembly 2 is a plurality of buss bars 114. The buss bars 114 are in electrical communication with the anodes 92 (not shown), cathodes 94 (not shown), and/or current conduits 130 (not shown) within the stack of electrode plates 50. Affixed to each of the buss bars 114 is a terminal 112. The terminals 112 are in the form of threaded posts. Each terminal 112 is affixed to the buss bar via a terminal retainer 116.

Figure 9:
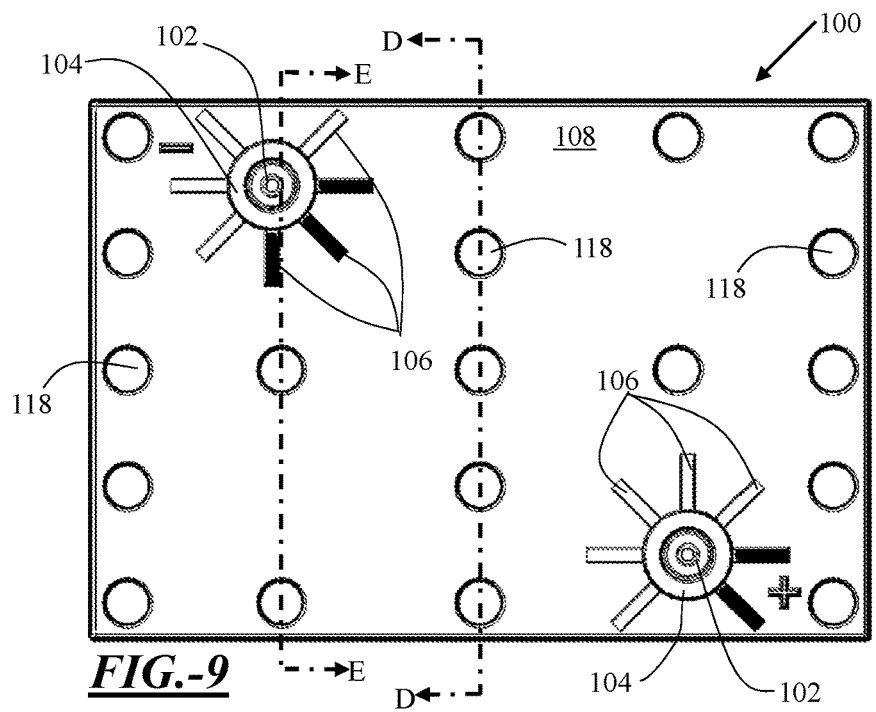
FIG. 9 illustrates an outwardly facing surface of a terminal cover.
Figure 10:
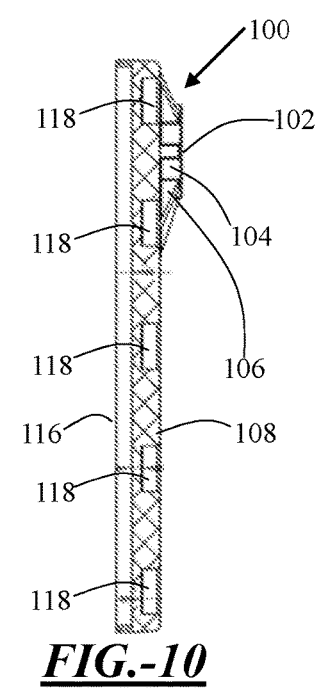
FIG. 10 is a cross-section view of a terminal cover along section D-D as shown in FIG. 9

FIG. 9 illustrates an outwardly facing surface 108 of a terminal cover 100. FIG. 10 illustrates a cross-section of a terminal cover 100 along section D-D. The terminal cover 100 includes a plurality of terminal openings 102. About at least two of the openings 102 is a raised edge 104. The raised edge 104 projects from the outwardly facing surface 108. A plurality of gussets 106 surround the raised edge 104 and opening 102. The terminal cover 100 includes a plurality of partial bores 118. The partial bores 118 extend only partially into the terminal cover 100.

Figure 11:
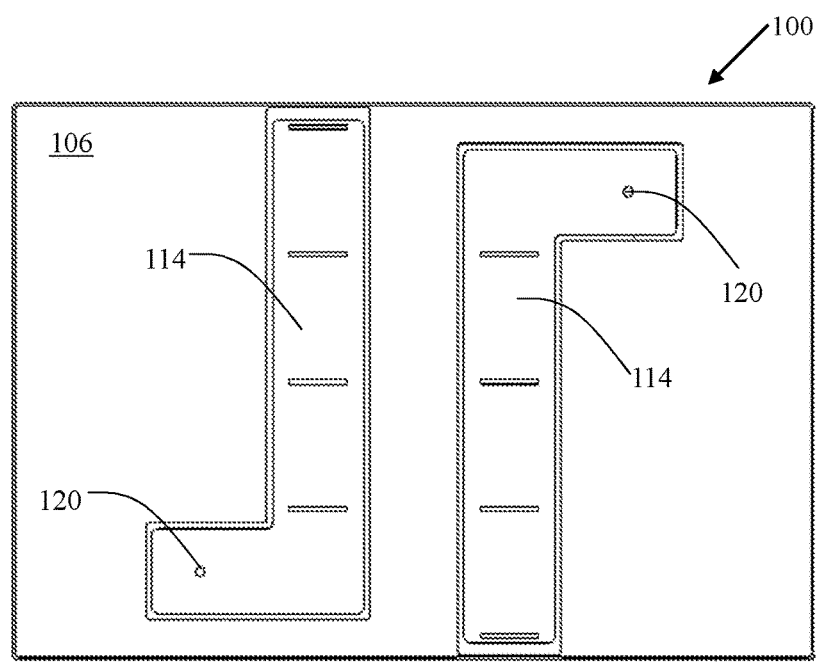
FIG. 11 illustrates an inwardly facing surface of a terminal cover.
Figure 12:
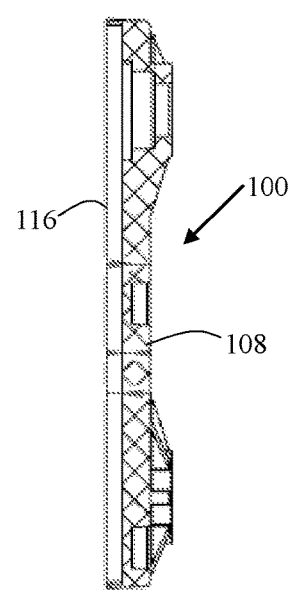
FIG. 12 is a cross-section view of a terminal cover along section E-E as shown in FIG. 9

FIG. 11 illustrates an inwardly facing surface 106 of a terminal cover 100. FIG. 12 illustrates a cross-section of a terminal cover 100 along section E-E (as shown in FIG. 9). Buss bars 114 are affixed to the inwardly facing surface 106. The buss bars 114 each include a terminal hole 120. The terminal hole 120 of each buss bar 114 is aligned (i.e., concentric) with the terminal opening 102 (as shown in FIGS. 9 and 10).

FIG. 13A-13C illustrate a buss bar 114 and terminal 112 assembly. The buss bar 114 has an L-shape. Specifically, the buss bar 114 includes a first leg 136 perpendicular to a second leg 138. The buss bar 114 includes a terminal hole 120. The buss bar 114 is able to transmit an electrical current from an interior of the battery assembly 2 (not shown) via a terminal 112. The terminal 112 includes a terminal post 122. The terminal post 122 is secured to the buss bar 114 via a terminal retainer 116.

Figure 14:
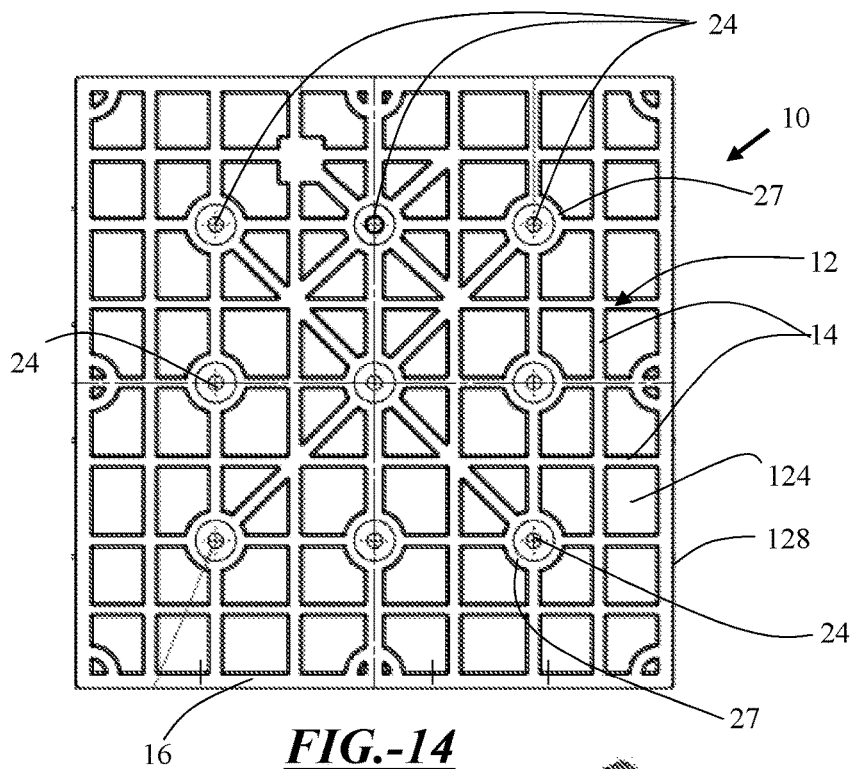
FIG. 14 is a front view of an end plate having an internal reinforcement structure.

FIG. 14 illustrates an internal reinforcement 12 structure of an end plate 10. The internal reinforcement structure 12 is located on a first exterior surface 124 of the end plate 10. The internal reinforcement structure 12 includes a plurality of ribs 14. An outer reinforcement rib 16 extends about a periphery of the end plate 10. The end plate 10 includes a plurality of openings 24. The openings 24 include a raised boss 27 about their periphery. The raised bosses 27 are connected to some of the plurality of ribs 14. The end plate 10 includes a peripheral surface 128.

Figure 15:
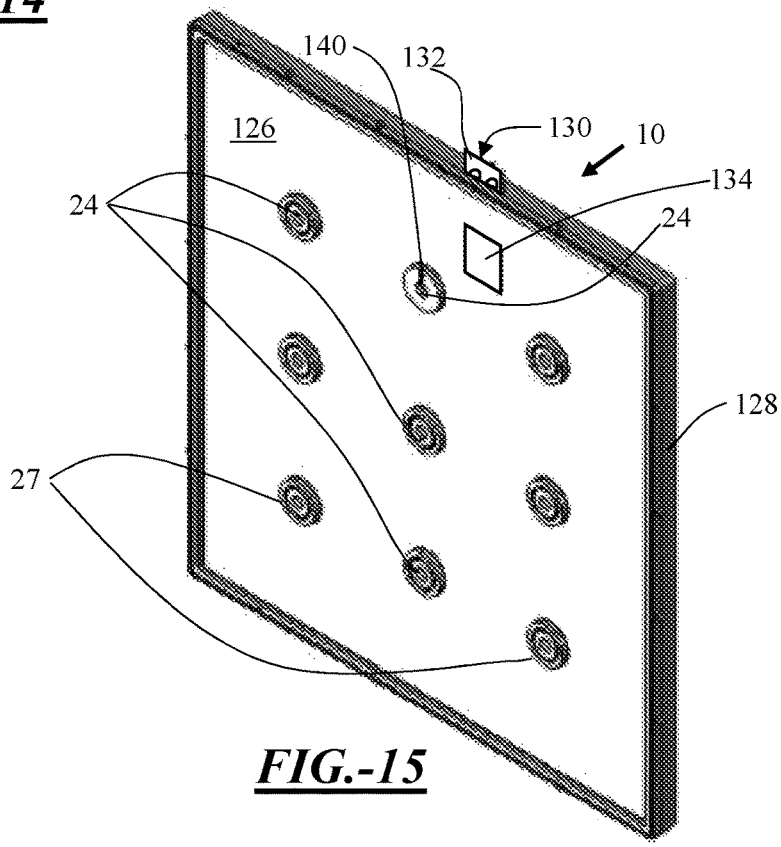
FIG. 15 illustrates an end plate with a current conductor and connection pad.

FIG. 15 illustrates a perspective view of an end plate 10. The end plate includes a second exterior surface 126 which is opposing the first exterior surface 124 (such as shown in FIG. 14). The second exterior surface 126 is substantially planar. Passing through the second exterior surface 126 is a plurality of openings 24. The openings include raised bosses 27 about their periphery projecting from the second exterior surface 126. One of the openings 24 is in communication with a vent hole 140. Affixed to the end plate 10 is a current conductor 130. The current conductor 130 includes a tab portion 132 which projects from a peripheral surface 128 of the end plate 10. When the end plate 10 is part of the battery assembly 2, the tab portion 132 is in electrical connection with one of the terminals 112 (not shown). Contact may be formed by being in contact with a buss bar 114 (not shown). The current conductor 130 passes into an interior of the end plate 10. The current conductor 130 is in electrical communication with a connection pads 134. The connection pad 134 is located on the second exterior surface 126 of the end plate 10. The second exterior surface 126 faces toward the stack of electrode plates 50.

Figure 16:
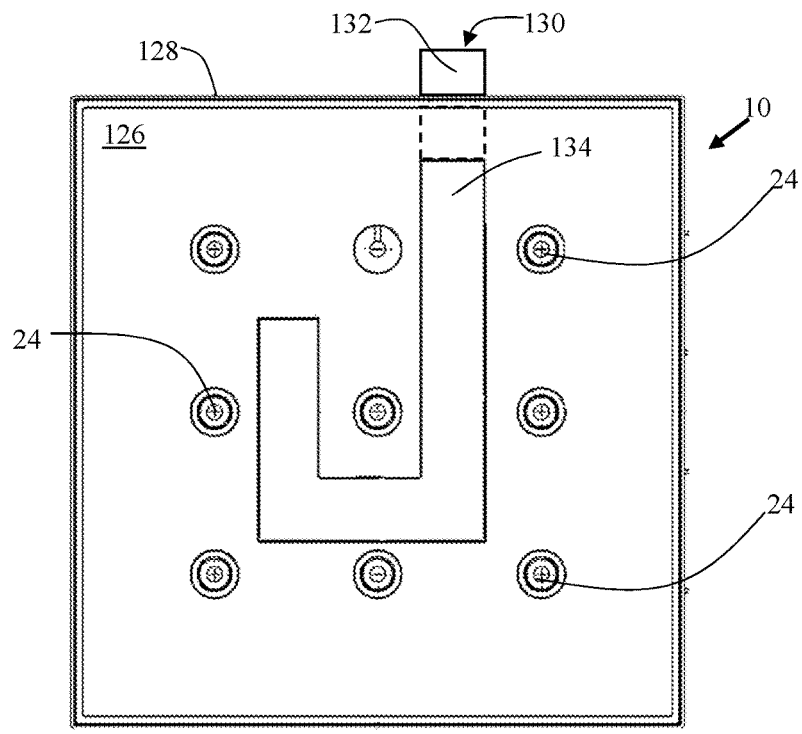
FIG. 16 illustrates an end plate having a connection pad.

FIG. 16 illustrates a connection pad 134 of an end plate 10. The connection pad 134 has a general J-shape. The connection pad is located between a plurality of the openings 24 of the end plate 10.

Figure 17:
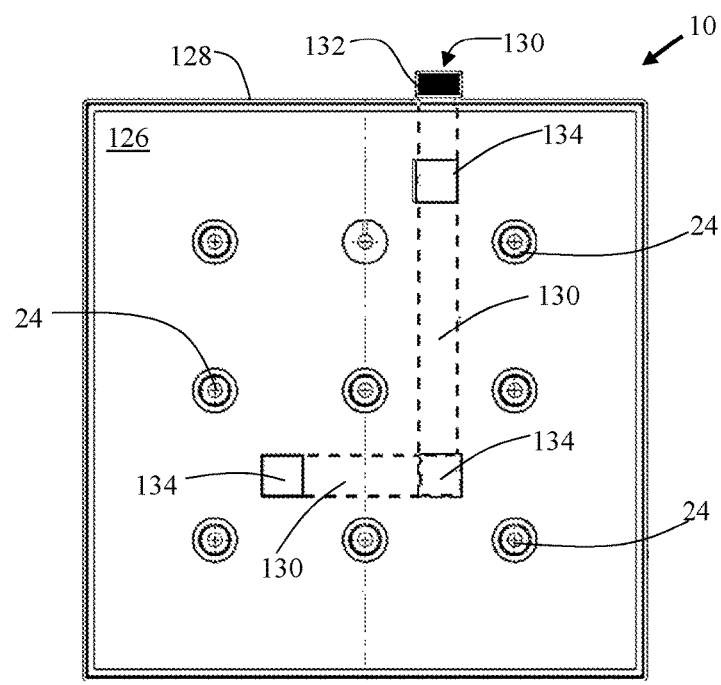
FIG. 17 illustrates an end plate having a plurality of connection pads.

FIG. 17 illustrates a plurality of connection pads 134 of an end plate 10. The current conductor 130 extends within an interior of the end plate 10. The current conductor 130 has a general L-shape. The current conductor 130 includes a tab portion 132 which projects from the peripheral surface 128 of the end plate 10. Located on the second exterior surface 126 of the end plate 10 is a plurality of connection pads 134. The connection pads 134 are electrically connected with the current conductor 130 at varying portions along a length of the current conductor 130.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps. Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. A battery assembly comprising:
   a) one or more stacks of a plurality of electrode plates comprising one or more bipolar plates having a substrate with an anode on one surface and a cathode on an opposing surface;
   b) two or more end plates at opposing ends of the one or more stacks of the plurality of electrode plates;
   c) two or more current conductors, wherein each individual current conductor of the two or more current conductors is affixed to an individual end plate of the two or more end plates;
   d) a separator and an electrolyte located between adjacent pairs of the plurality of electrode plates of the one or more stacks;
   e) a terminal cover located adjacent to the plurality of electrode plates which covers only a single side of the one or more stacks of the plurality of electrode plates and traverses across the plurality of electrode plates and the two or more end plates;
   f) two or more terminals which are each separate from and in electrical communication with an individual current conductor of the two or more current conductors, and the two or more terminals are configured to transmit electrical current from the battery assembly to an exterior load;
   g) two or more buss bars which are comprised of one or more conductive materials, wherein the two or more buss bars are located between the terminal cover and the one or more stacks of the plurality of electrode plates, wherein each of the two or more buss bars include one or more terminal retainers which extend away from the plurality of electrode plates from a surface of a buss bar of the two or more buss bars, and wherein the one or more terminal retainers include one of the two or more terminals located therein;
   h) two or more connection pads, wherein each of the two or more end plates include at least one of the two or more connection pads affixed thereto such as to face toward the plurality of electrode plates;

wherein each of the two or more buss bars are separate from and in electrical communication with an individual terminal of the two or more terminals, are substantially parallel to one or more peripheral edges of the plurality of electrode plates, and traverse across the one or more peripheral edges of at least some of the plurality of electrode plates;
   wherein each of the two or more terminals pass through, are in contact with, or both pass through and are in contact with a corresponding buss bar of the two or more buss bars;
   wherein the two or more terminals pass through the terminal cover such that the two or more terminals are exposed outside of the battery assembly;
   wherein each of the two or more current conductors are in physical contact and electrical communication with a respective buss bar of the two or more buss bars to form the electrical communication with the individual terminal;
   wherein the one or more terminal retainers are substantially cylindrical, spherical, conical, cuboidal, cubical, prismed, or any combination thereof and include a hollow opening throughout an entire length of the one or more terminal retainers in which the one of the two or more terminals is located;
   wherein the two or more connection pads are substantially planar and parallel to an inwardly facing surface of the two or more end plates; and
   wherein the two or more connection pads are arranged to form a straight line, a J-shape, an L-shape, a T-shape, or a combination thereof on the two or more end plates.

2. The battery assembly of claim 1, wherein the terminal cover includes one or more openings; and
   wherein the two or more terminals pass from an interior of the battery assembly to the outside of the battery assembly through at least one of the one or more openings.

3. The battery assembly of claim 2, wherein the one or more openings of the terminal cover are reinforced by one or more reinforcement structures.

4. The battery assembly of claim 3, wherein the one or more reinforcement structures include one or more ribs, stakes, gussets, backing plates, fiber fillers, or any combination thereof.

5. The battery assembly of claim 1, wherein the terminal cover is attached to or part of the one or more peripheral edges of one or more of the plurality of electrode plates, a membrane, the two or more end plates, an exterior case, or any combination thereof of the battery assembly.

6. The battery assembly of claim 1, wherein the two or more terminals include one or more mechanical fasteners, posts, recesses, or a combination thereof; and
   wherein the two or more terminals are comprised of one or more conductive materials.

7. The battery assembly of claim 6, wherein the two or more terminals include the one or more posts; and
   wherein the one or more posts include one or more SAE Posts, JIS posts, L terminals, or a combination thereof.

8. The battery assembly of claim 1, wherein the two or more buss bars are affixed to the terminal cover, a membrane, an exterior case, the one or more stacks of the plurality of electrode plates, the separators, or any combination thereof.

9. The battery assembly of claim 1, wherein the two or more buss bars are molded into the terminal cover.

10. The battery assembly claim 1,
wherein the two or more connection pads are in electrical communication with the one or more current conductors; and
wherein the two or more connection pads include a plurality of connection pads on each of the two or more end plates.

11. The battery assembly of claim 1, wherein the two or more end plates include a first monopolar plate, a second monopolar plate, an end plate adjacent to the first monopolar plate, an end plate adjacent to the second monopolar plate, or any combination thereof.

12. The battery assembly of claim 1, wherein the two or more end plates include a reinforcement structure, and
wherein the two or more connection pads are located on a surface of the two or more end plates opposite the reinforcement structure and facing toward the plurality of electrode plates.

13. The battery assembly of claim 1, wherein the one or more stacks of the plurality of electrode plates are assembled into a plurality of electrochemical cells;
wherein one or more openings are located in each of the two or more end plates, the one or more bipolar plates, two or more monopolar plates, the separator, or any combination thereof such that the openings align with one another in a transverse direction to form one or more channels which are integrated into the battery assembly; and
wherein the one or more openings include one or more inserts molded therein which interlock to seal the one or more channels.

14. The battery assembly of claim 1, wherein the two or more end plates includes a first end plate and a second end plate located at opposing ends of the one or more stacks of the plurality of electrode plates; and
wherein the terminal cover traverses across the battery assembly from the first end plate to the second end plate.

15. A battery assembly comprising:
a) one or more stacks of a plurality of electrode plates comprising one or more bipolar plates having a substrate with an anode on one surface and a cathode on an opposing surface;
b) two or more end plates at opposing ends of the one or more stacks of the plurality of electrode plates, wherein each of the two or more end plates include a reinforcement structure;
c) two or more current conductors, wherein each individual current conductor of the two or more current conductors is affixed to an individual end plate of the two or more end plates;
d) a separator and an electrolyte located between adjacent pairs of the electrode plates of the one or more stacks;
e) a terminal cover located adjacent to the plurality of electrode plates which covers only a single side of the one or more stacks of the plurality of electrode plates and traverses across the plurality of electrode plates and the two or more end plates, wherein the terminal cover includes one or more openings which are reinforced by one or more reinforcement structures, wherein the one or more reinforcement structures include one or more ribs, stakes, gussets, backing plates, fiber fillers, or any combination thereof;
f) two or more terminals which are each separate from and in electrical communication with an individual current conductor of the two or more current conductors, and the two or more terminals are configured to transmit electrical current from the battery assembly to an exterior load, wherein the two or more terminals pass from an interior of the battery assembly to the outside of the battery assembly through at least one of the one or more openings in the terminal cover, and wherein the two or more terminals include one or more posts;
g) two or more buss bars which are comprised of one or more conductive materials, wherein the two or more buss bars are located between the terminal cover and the one or more stacks of the plurality of electrode plates, wherein the two or more buss bars are molded into the terminal cover and substantially parallel to an inward facing surface of the terminal cover, wherein each of the two or more buss bars include one or more terminal retainers which extend away from the plurality of electrode plates from a surface of a buss bar of the two or more buss bars, and wherein the one or more terminal retainers include one of the two or more terminals located therein;
h) two or more connection pads, wherein each of the two or more end plates include at least one of the two or more connection pads located on a surface of the two or more end plates opposite the reinforcement structure and facing toward the plurality of electrode plates;
wherein each of the two or more buss bars are separate from and in electrical communication with an individual terminal of the two or more terminals, are substantially parallel to one or more peripheral edges of the plurality of electrode plates, and traverse across the one or more peripheral edges of at least some of the plurality of electrode plates;
wherein each of the two or more terminals pass through, are in contact with, or both pass through and are in contact with a corresponding buss bar of the two or more buss bars;
wherein the two or more terminals pass through the terminal cover such that the two or more terminals are exposed outside of the battery assembly; and
wherein each of the two or more current conductors are in physical contact and electrical communication with a respective buss bar of the two or more buss bars to form the electrical communication with the individual terminal;
wherein the one or more terminal retainers are substantially cylindrical, spherical, conical, cuboidal, cubical, prismed, or any combination thereof and include a hollow opening throughout an entire length of the one or more terminal retainers in which the one of the two or more terminals is located;
wherein the two or more connection pads are substantially planar and parallel to an inwardly facing surface of the two or more end plates; and
wherein the two or more connection pads are arranged to form a straight line, a J-shape, an L-shape, a T-shape, or a combination thereof on the two or more end plates.

16. The battery assembly of claim 15, wherein the one or more stacks of the plurality of electrode plates are assembled into a plurality of electrochemical cells;
wherein one or more openings are located in each of the two or more end plates, the one or more bipolar plates, two or more monopolar plates, the separator, or any combination thereof such that the openings align with one another in a transverse direction to form one or more channels which are integrated into the battery assembly; and wherein the one or more openings include one or more inserts molded therein which interlock to seal the one or more channels.

17. A battery assembly comprising:
a) one or more stacks of a plurality of electrode plates comprising one or more bipolar plates having a substrate with an anode on one surface and a cathode on an opposing surface;
b) two or more end plates at opposing ends of the one or more stacks of the plurality of electrode plates;
c) two or more current conductors, wherein each individual current conductor of the two or more current conductors is affixed to an individual end plate of the two or more end plates;
d) a separator and an electrolyte located between adjacent pairs of the electrode plates of the one or more stacks;
e) a terminal cover located adjacent to the plurality of electrode plates which covers only a single side of the one or more stacks of the plurality of electrode plates and traverses across the plurality of electrode plates and the two or more end plates, wherein the terminal cover includes one or more openings which are reinforced by one or more reinforcement structures, wherein the one or more reinforcement structures include one or more ribs, stakes, gussets, backing plates, fiber fillers, or any combination thereof;
f) two or more terminals which are each separate from and in electrical communication with an individual current conductor of the two or more current conductors, and the two or more terminals are configured to transmit electrical current from the battery assembly to an exterior load;
g) two or more buss bars which are comprised of one or more conductive materials, wherein the two or more buss bars are located between the terminal cover and the one or more stacks of the plurality of electrode plates, wherein each of the two or more buss bars is directly affixed to each of the two or more end plates, wherein each of the two or more buss bars include one or more terminal retainers which extend away from the plurality of electrode plates from a surface of a buss bar of the two or more buss bars, and wherein the one or more terminal retainers include one of the two or more terminals located therein;
i) two or more connection pads, wherein each of the two or more end plates include at least one of the two or more connection pads affixed thereto such as to face toward the plurality of electrode plates;
wherein each of the two or more current conductors are in physical contact and electrical communication with a respective buss bar of the two or more buss bars to form the electrical communication with an individual terminal;
wherein each of the two or more terminals pass through, are in contact with, or both pass through and are in contact with a corresponding buss bar of the two or more buss bars;
wherein the two or more terminals pass through the terminal cover such that the two or more terminals are exposed outside of the battery assembly;
wherein each of the two or more buss bars are separate from and in electrical communication with an individual terminal of the two or more terminals, are substantially parallel to one or more peripheral edges of the plurality of electrode plates, and traverse across the one or more peripheral edges of at least some of the plurality of electrode plates;
wherein the one or more terminal retainers are substantially cylindrical, spherical, conical, cuboidal, cubical, prismed, or any combination thereof and include a hollow opening throughout an entire length of the one or more terminal retainers in which the one of the two or more terminals is located; and
wherein the two or more connection pads are arranged to form a straight line, a J-shape, an L-shape, a T-shape, or a combination thereof on the two or more end plates.

18. The battery assembly of claim 17, wherein the one or more stacks of the plurality of electrode plates are assembled into a plurality of electrochemical cells;
wherein one or more openings are located in each of the two or more end plates, the one or more bipolar plates, two or more monopolar plates, the separator, or any combination thereof such that the openings align with one another in a transverse direction to form one or more channels which are integrated into the battery assembly; and
wherein the one or more openings include one or more inserts molded therein which interlock to seal the one or more channels.

19. The battery assembly of claim 17, wherein the two or more end plates include a reinforcement structure; and
wherein the two or more connection pads are located on a surface of the two or more end plates opposite the reinforcement structure and facing toward the plurality of electrode plates.

20. The battery assembly of claim 17, wherein the two or more buss bars are molded into the terminal cover.

* * * * *